(12) United States Patent
Ueda et al.

(10) Patent No.: US 7,435,007 B2
(45) Date of Patent: Oct. 14, 2008

(54) SELF-ALIGNING ROLLER BEARING

(75) Inventors: Kouji Ueda, Kanagawa (JP); Tohru Ueda, Kanagawa (JP)

(73) Assignee: NSK Ltd., Tokyo (JP)

( * ) Notice: Subject to any disclaimer, the term of this patent is extended or adjusted under 35 U.S.C. 154(b) by 363 days.

(21) Appl. No.: 10/561,020

(22) PCT Filed: Nov. 12, 2004

(86) PCT No.: PCT/JP2004/017212

§ 371 (c)(1),
(2), (4) Date: Dec. 16, 2005

(87) PCT Pub. No.: WO2005/047718

PCT Pub. Date: May 26, 2005

(65) Prior Publication Data

US 2007/0092174 A1 Apr. 26, 2007

(30) Foreign Application Priority Data

Nov. 14, 2003 (JP) .............................. 2003-385608
Mar. 24, 2004 (JP) .............................. 2004-087057

(51) Int. Cl.
*F16C 23/08* (2006.01)
*F16C 33/58* (2006.01)

(52) U.S. Cl. ....................... 384/558; 384/516; 384/569; 384/625

(58) Field of Classification Search ................ 384/448, 384/490–492, 495, 513–516, 565–569, 571, 384/912

See application file for complete search history.

(56) References Cited

U.S. PATENT DOCUMENTS

| | | | | | |
|---|---|---|---|---|---|
| 3,737,204 | A | * | 6/1973 | Burkhardt | ................... 384/569 |
| 3,990,753 | A | * | 11/1976 | Kellstrom et al. | ........... 384/450 |
| 4,916,751 | A | * | 4/1990 | Sumita et al. | ................ 384/516 |
| 5,338,377 | A | * | 8/1994 | Mitamura et al. | ........... 384/912 |
| 6,547,443 | B2 | * | 4/2003 | Hanai et al. | .................. 384/571 |
| 6,893,372 | B2 | * | 5/2005 | Matsuyama et al. | ......... 384/450 |
| 2003/0198420 | A1 | * | 10/2003 | Matsuyama et al. | ......... 384/565 |

FOREIGN PATENT DOCUMENTS

| | | | |
|---|---|---|---|
| EP | 1344953 | A2 * | 9/2003 |
| JP | 57-61933 | B2 | 12/1982 |
| JP | 1-220720 | A | 9/1989 |
| JP | 02186120 | A * | 7/1990 |
| JP | 4-39414 | A | 2/1992 |
| JP | 2000-179559 | A | 6/2000 |
| JP | 2002-339989 | A | 11/2002 |
| JP | 2005-30425 | A | 2/2005 |

* cited by examiner

*Primary Examiner*—Marcus Charles
(74) *Attorney, Agent, or Firm*—Sughrue Mion, PLLC

(57) ABSTRACT

A roughness of an outer ring raceway surface 14 formed on an inner peripheral surface of an outer ring 13 is made larger than a roughness of inner ring raceway surfaces 12a, 12b of an inner ring 11. Also, an average roughness Ra of the outer ring raceway surface 14 is set within 0.1 µm≦Ra≦0.5 µm in an axial direction and a circumferential direction in ranges of $b_1/(B/2) \leq 0.9$, $b_2/(B/2) \leq 0.9$ and in a measured length of 0.1 mm to 1.0 mm where B is a width of the outer ring 13 and $b_1$, $b_2$ are a distance from both end surfaces of the outer ring 13 in the axial direction respectively. A roughness parameter S of the outer ring raceway surface is set within $0 < S \leq 20$ µm.

11 Claims, 15 Drawing Sheets

FIG. 2
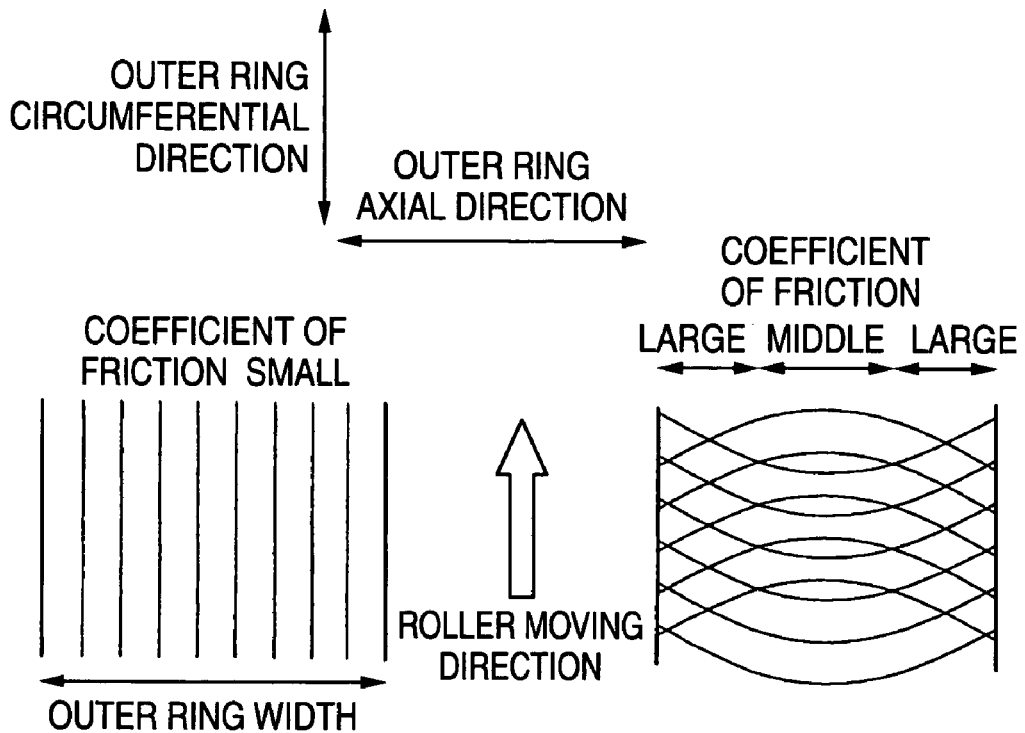
(a) CASE OF STRAIGHT GRINDING
(b) CASE OF CUP-GRINDSTONE GRINDING
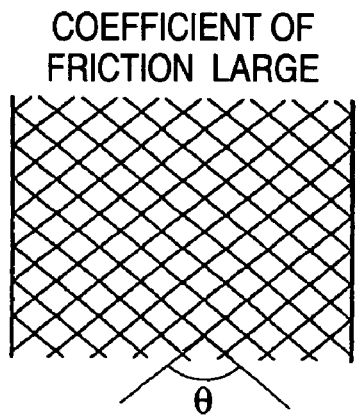
(c) ROUGHNESS PATTERN BY WHICH LONGEST LIFETIME IS GIVEN

FIG. 3
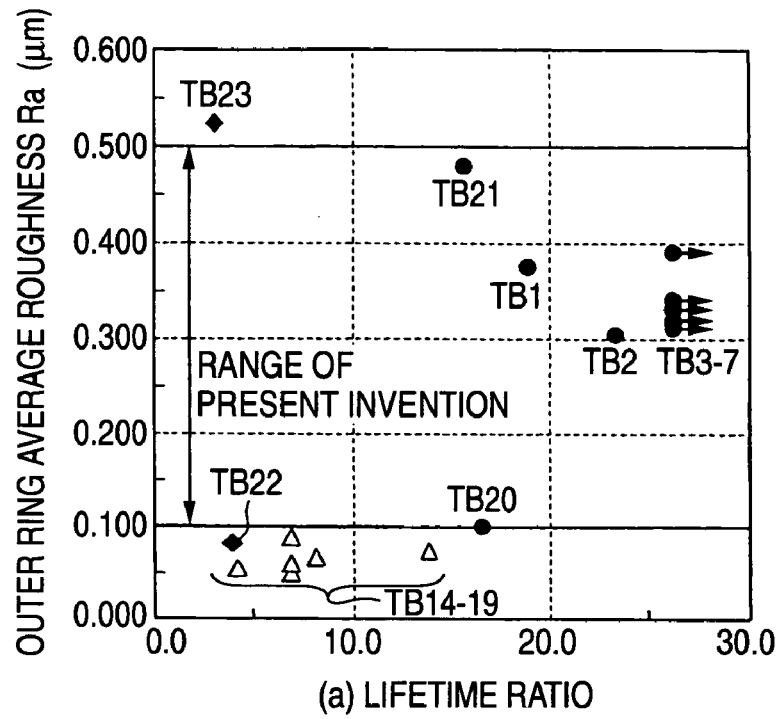
(a) LIFETIME RATIO
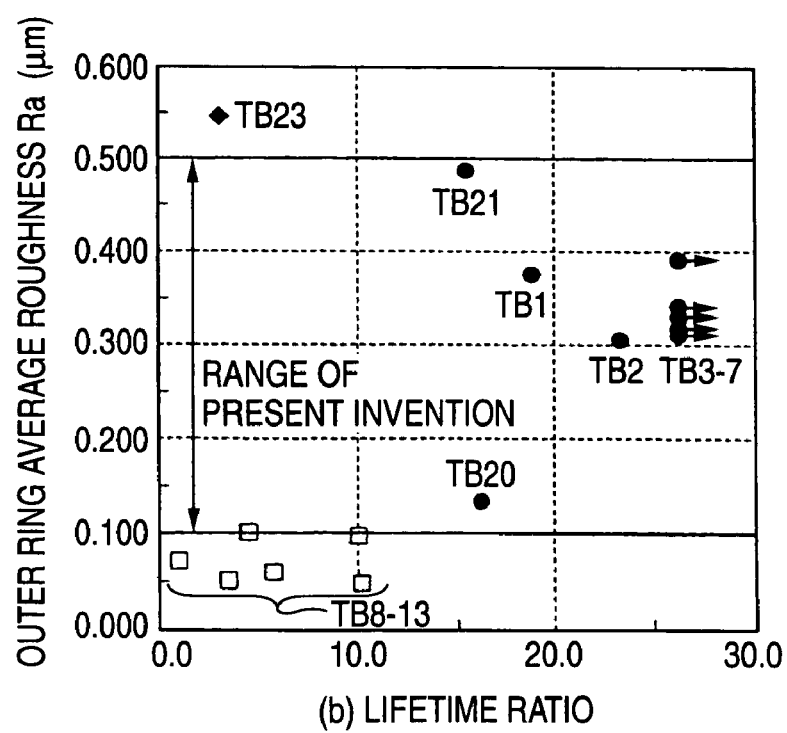
(b) LIFETIME RATIO

FIG. 5
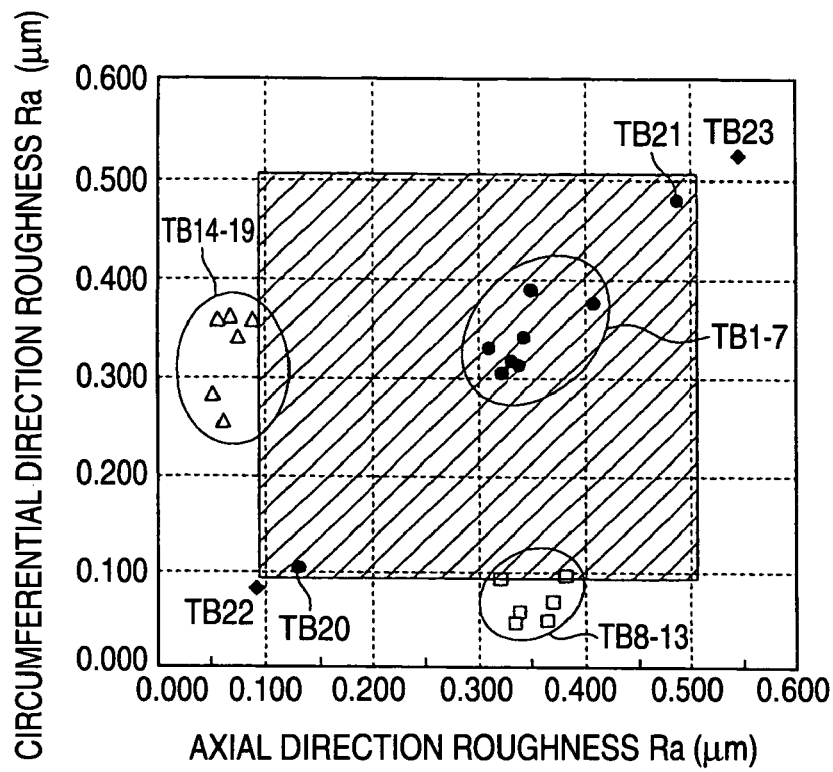
ROUGHNESS MEASURING CONDITIONS
MEASURED LENGTH l = 0.5 mm
MEASURED LOCATIONS
OUTER RING AXIAL DIRECTION: b1 / (B/2) = 0.7
OUTER RING CIRCUMFERENTIAL DIRECTION: b1 / (B/2) = 0.4
FIG. 6 $\quad S = \dfrac{1}{n}\sum_{i=1}^{n} S_i$
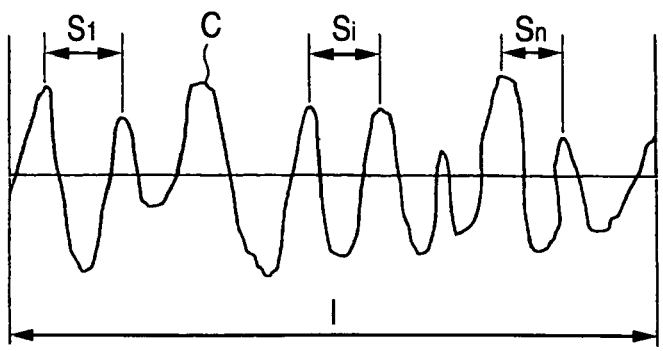

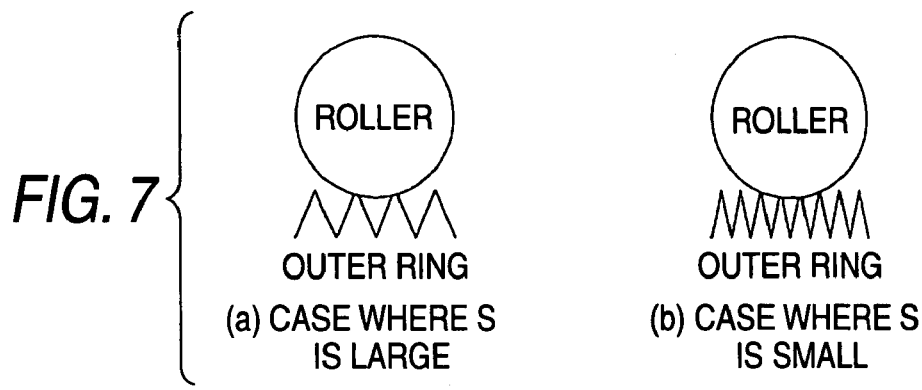
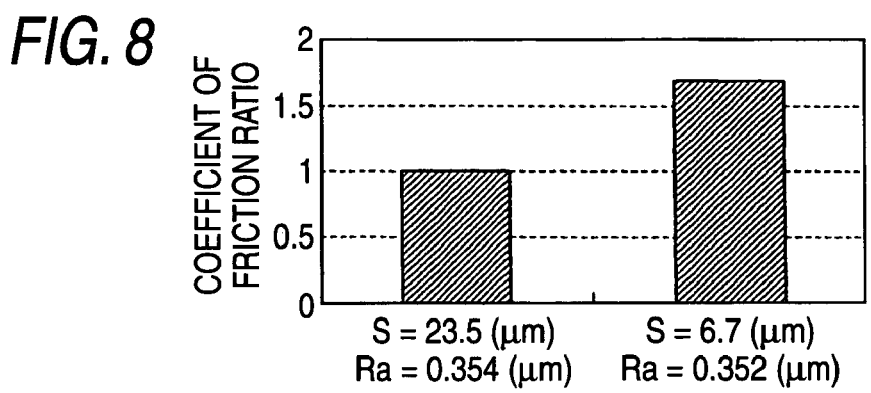
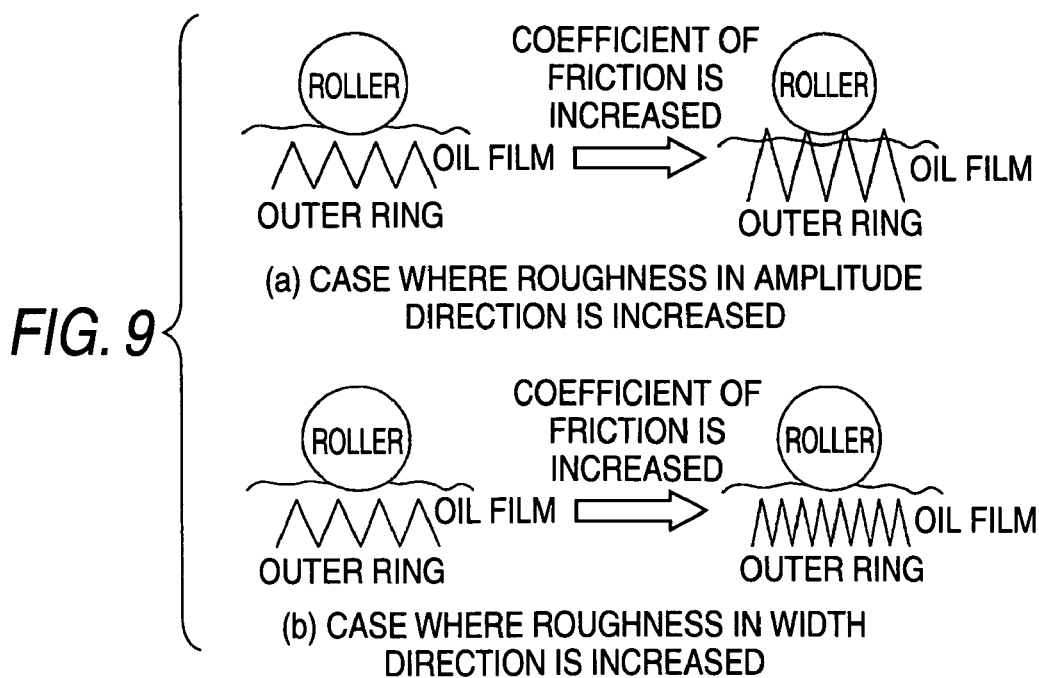

(a) S LARGE
(COEFFICIENT OF FRICTION SMALL)

(b) S SMALL
(COEFFICIENT OF FRICTION LARGE)

SELF-ALIGNING ROLLER BEARING

TECHNICAL FIELD

The present invention relates to lifetime enhancement of a self-aligning roller bearing used in a general industrial machinery, a machine tool, a vibrating screen, steel industry, a motorcycle engine, and so forth.

BACKGROUND ART

The self-aligning roller bearing has the advantage of capable of preventing the generation of abnormal load and increasing the radial load capacity because a contact condition of the rolling elements is not varied even when the outer ring or the inner ring is inclined due to a fitting error or an impact load. For this reason, the self-aligning roller bearing is used widely as various roll neck bearings in the papermaking machine, the vehicle bearing, various industrial bearings, and so on.

By the way, the normal ball bearing or cylindrical roller bearing is broken down by the subsurface initiated facture in a clean environment in which an oil film is satisfactorily formed. This subsurface initiated facture signifies that the fatigue crack is generated and widened from the non-metallic inclusion contained in the material as the starting point. Therefore, lifetime enhancement of the ball bearing and the cylindrical roller bearing can be achieved by increasing an index of cleanliness of material.

However, unlike the above bearings, in some cases the surface initiated failure is caused in the self-aligning roller bearing according to the application condition. This surface initiated failure signifies that the minute plastic flow is generated on the surface of the inner ring in the clean environment and then the peeling crack is generated and spread from there to lead to the flaking. As a result, an increase in the index of cleanliness of material does not have a noticeable effect on the lifetime enhancement of the self-aligning roller bearing.

In the self-aligning roller bearing, a skew largely affects prevention of the heat generation or lifetime enhancement of the bearing.

As the measure for this, in order to control a coefficient of friction between the inner ring and the rolling elements and a coefficient of friction between the outer ring and the rolling elements, it is applied to control a contact area of the bearing and a surface roughness of the raceway surface. For example, such an instance is disclosed that the skew is controlled by setting the surface roughness of the outer ring raceway surface larger than the surface roughness of the inner ring raceway surface (the surface roughness of the inner ring raceway surface is 0.1 μmRa or less, and the surface roughness of the outer ring raceway surface is 0.2 μmRa or more) to attain the lifetime enhancement (see JP-B-57-61933).

As the reason for lifetime enhancement, such a reason is assumed that, in case the roughness of the outer ring is made larger than that of the inner ring, a positive skew to incline the rolling elements to the outside of the bearing occurs to reduce the axial load. Also, it is concluded that, since a negative skew to incline the rolling elements to the inside of the bearing increases the axial load, such negative skew exerts a bad influence upon the lifetime of the bearing.

However, when the roughness of the outer ring raceway surface is made simply larger than that of the inner ring raceway surface, in some cases either the negative skew is ready to occur or the lifetime is prolonged even though the negative skew is increased. Therefore, it is hard to say that the skew control has a critical effect on an extension of the lifetime. Also, in case the roughness of the outer ring raceway surface is made excessively large, unevenness of the outer ring raceway surface becomes larger than a thickness of the oil film. Therefore, the lubrication condition is worsened and conversely the lifetime of the bearing is liable to become short.

Also, the approach of increasing a frictional force by forming the surface roughness of the outer ring raceway surface larger than that of the inner ring raceway surface is effective for the skew control or the suppression of minute slip. However, actually one bearing has a variation in the surface roughness of the inner ring raceway surface and the outer ring raceway surface (variation in the circumferential direction) according to locations of the inner and outer rings. Therefore, magnitudes of the frictional forces generated at the contact portion between the inner ring raceway surface and the rolling element and the contact portion between the outer ring raceway surface and the rolling element are varied according to the rotation of the bearing in respective locations. As a result, it is likely that the actual effect of suppressing the skew and the slip in the minute area is varied.

For example, when the roughness was measured at several locations in one bearing, individual values of the roughness are varied. In the situation that the machining condition is not good when viewed in the light of the roughness range, if there exist the portions at which the surface roughness is reversed between the inner ring raceway surface and the outer ring raceway surface because the roughness range of the inner ring raceway surface and the roughness range of the outer ring raceway surface come very close to each other or overlap with each other, a frictional force generated at the contact portions between the rolling elements and the inner and outer rings is varied and then the rotation of the rollers becomes unstable. Thus, the minute slip is generated at the contact portions between the inner ring and the rolling elements, and also the surface damage such as the peeling, or the like is prone to occur.

Therefore, it is not enough just to make the surface roughness of the outer ring raceway surface larger than that of the inner ring raceway surface. As a consequence, a ratio of the surface roughness between the outer ring raceway surface and the inner ring raceway surface must be specified with regard to a roughness distribution of the outer ring raceway surface and a roughness distribution of the inner ring raceway surface in the bearing.

Also, in the self-aligning roller bearing, a retained austenite content is reduced substantially to 0% by applying the high temperature tempering to the inner and outer rings at 200° C. or more since normally the retained austenite is decomposed under the high temperature application condition to cause a dimensional change. This high temperature tempering process can cause the retained austenite to decompose, but such process exerts the harmful effect such that the hardness is lowered. Therefore, the surface damage such as the peeling, or the like is apt to occur on the inner ring and thus the lifetime of the bearing is shortened.

In contrast, if the surface roughness of the outer ring is increased, i.e., if an upper limit value of the roughness range of the inner ring raceway surface on a center line is set larger than a lower limit value of the roughness range of the outer ring raceway surface on a center line, the surface damage such as the peeling, or the like of the inner ring can be suppressed as described above, and also the facture of the inner ring can be suppressed. On the other hand, a frictional force generated at the contact portions between the outer ring whose roughness is large and the rollers whose roughness is relatively appropriate is increased and thus the outer ring drives the rollers. As a result, the fatigue of the roller surface makes progress considerably.

DISCLOSURE OF THE INVENTION

The present invention has been made in view of above respects, and it is an object of the present invention to provide a self-aligning roller bearing capable of achieving an extension of the lifetime by suppressing an early flaking caused due to the surface damage such as the peeling, or the like.

In order to overcome the above problem, a first self-aligning roller bearing of the present invention in which double row rollers as rolling elements are arranged rollably between an inner ring and an outer ring in a circumferential direction, wherein a roughness of an outer ring raceway surface formed on an inner peripheral surface of the outer ring is made larger than a roughness of an inner ring raceway surface formed on an outer peripheral surface of the inner ring, and an average roughness Ra of the outer ring raceway surface is set within 0.1 μm≦Ra≦0.5 μm in an axial direction and a circumferential direction, and a roughness parameter S that is defined by $$S = \frac{1}{n}\sum_{i=1}^{n} S_i$$

where n is a number of peaks of the roughness of a roughness curve indicating the roughness of the outer ring raceway surface, and
Si is an interval between neighboring peaks of the roughness curve is set within 0<S≦20 μm.

More preferably, an average roughness of a rolling contact surface of the rolling element is set to Ra<0.μm, and an average roughness of the inner ring raceway surface is set to Ra<0.15 μm.

More preferably, an inequality Rao/Rai≧1.5 is satisfied where Rai is an upper limit value of a roughness range on the inner ring raceway surface on a center line and Rao is a lower limit value of a roughness range on the inner ring raceway surface on a center line, and a difference of a retained austenite content γR between the rolling elements and at least any one of the inner ring and the outer ring is set to 3% or more in volume ratio.

More preferably, the average roughness Ra of the outer ring raceway surface is set within 0.1 μm≦Ra≦0.5 μm in the axial direction and the circumferential direction in ranges of $b_1$, (B/2)≦0.9, $b_2$/(B/2)≦0.9 and in a measured length of 0.1 mm to 1.0 mm where B is a width of the outer ring and $b_1$, $b_2$ are a distance from both end surfaces of the outer ring respectively, and the roughness parameter S is set within 0<S≦20 μm.

More preferably, the outer ring raceway surface has machining traces that intersect with each other and the machining traces are formed by a super finishing.

Also, a second self-aligning roller bearing of the present invention in which double row rollers as rolling elements are arranged rollably between an inner ring and an outer ring in a circumferential direction, wherein a roughness of an outer ring raceway surface formed on an inner peripheral surface of the outer ring is made larger than a roughness of an inner ring raceway surface formed on an outer peripheral surface of the inner ring, and an average roughness Ra of the outer ring raceway surface is set within 0.1 μm≦Ra≦0.5 μm in an axial direction and a circumferential direction, an average roughness of a rolling contact surface of the rolling element is set to Ra<0.1 μm, and an average roughness of the inner ring raceway surface is set to Ra<0.15 μm.

More preferably, an inequality Rao/Rai≧1.5 is satisfied where Rai is an upper limit value of a roughness range on the inner ring raceway surface on a center line and Rao is a lower limit value of a roughness range on the inner ring raceway surface on a center line, and a difference of a retained austenite content γR between the rolling elements and at least any one of the inner ring and the outer ring is set to 3% or more in volume ratio.

More preferably, the outer ring raceway surface has machining traces that intersect with each other and the machining traces are formed by a super finishing.

In addition, a third self-aligning roller bearing of the present invention in which double row rollers as rolling elements are arranged rollably between an inner ring and an outer ring in a circumferential direction, wherein a roughness of an outer ring raceway surface formed on an inner peripheral surface of the outer ring is made larger than a roughness of an inner ring raceway surface formed on an outer peripheral surface of the inner ring, and an inequality Rao/Rai≧1.5 is satisfied where Rai is an upper limit value of a roughness range on the inner ring raceway surface on a center line and Rao is a lower limit value of a roughness range on the inner ring raceway surface on a center line, and a difference of a retained austenite content γR between the rolling elements and at least any one of the inner ring and the outer ring is set to 3% or more in volume ratio.

More preferably, the outer ring raceway surface has machining traces that intersect with each other and the machining traces are formed by a super finishing.

According to the first self-aligning roller bearing of the present invention, a local variation of the roughness can be reduced in the overall range of the outer ring raceway surface that comes into contact with the roller, and the coefficient of friction of the outer ring raceway surface to the roller can be stably increased. Therefore, the rotation slip of the roller can be suppressed and also the early flaking caused due to the surface damage such as the peeling, or the like can be suppressed, whereby the extension of the lifetime can be achieved.

Also, because the roughness parameter S of the outer ring raceway surface is set within 0<S≦20 μm, the coefficient of friction at the contact portion between the outer ring raceway surface and the roller can be increased, and the slip of the roller can be suppressed. Therefore, the early flaking caused due to the surface damage such as the peeling, or the like can be suppressed, and thus the lifetime enhancement of the self-aligning roller bearing can be achieved.

Also, according to the second self-aligning roller bearing of the present invention, for the purpose of suppressing the tangential force acting on the inner ring and the rolling element and acting as the flaking cause of the self-aligning roller bearing, the average roughness of the rolling contact surface of the rolling element is set to Ra<0.1 μm, the average roughness of the inner ring raceway surface is set to Ra<0.15 μm, and the average roughness Ra of the outer ring raceway surface is set within 0.1 μm≦Ra≦0.5 μm. Therefore, generation of the minute plastic flow on the inner ring raceway surface can be suppressed, and thus the stable lifetime enhancement can be attained.

In addition, according to the third self-aligning roller bearing of the present invention, if the roughness of the outer ring is increased by setting the hardness of the roller as the rolling elements harder than the raceway rings and leaving the retained austenite, the minute slip on the inner ring can be suppressed and thus the surface fatigue of the inner ring can be reduced, but the roller becomes the portion that is most susceptible to the surface fatigue. Based on this phenomenon, the lifetime can be prolonged by applying the material specification that is resistant to the surface fatigue to the rollers that are liable to be subjected to the fatigue. It is very effective for such surface damage such as the peeling, or the like to enhance the surface hardness of the rolling elements as well as to leave the retained austenite.

BRIEF DESCRIPTION OF THE DRAWINGS

FIG. 2 is view explaining an action of the self-aligning roller bearing according to the present invention;

FIG. 3 is a view showing a relationship between an average roughness and a lifetime ratio of test bearings given in Table 1;

FIG. 5 is a view showing a relationship between a roughness in a circumferential direction and a roughness in an axial direction of the test bearings;

FIG. 6 is a view explaining a roughness parameter S of the outer ring raceway surface;

FIG. 7 is view showing schematically a contact condition between the outer ring raceway surface and a roller in both the case where the roughness parameter S of the outer ring raceway surface is large and the case where such parameter S is small;

FIG. 8 is a view showing measured values of a coefficient of friction at a contact portion between the outer ring raceway surface and the roller;

FIG. 9 is view showing schematically a lubrication condition when the coefficient of friction at the contact portion between the outer ring raceway surface and the roller is increased;

In this case, in above Figures, a reference symbol 10 denotes a self-aligning roller bearing, 11, 21, 31 inner ring, 12a, 12b, 22, 32a inner ring raceway surface, 13, 23, 33 outer ring, 14, 24, 34a outer ring raceway surface, 15, 25, 35 roller (rolling element), and 16, 26, 36 retainer.

BEST MODE FOR CARRYING OUT THE INVENTION

Embodiments of the present invention will be explained with reference to the drawings hereinafter. In this case, the present embodiments show merely an embodiment of the present invention respectively, and should not be interpreted at all to be limited to these embodiments. Also, a change of design may be applied appropriately to these embodiments within a scope of the present invention.

A first embodiment of the present invention will be explained with reference to FIGS. 1 to 12 hereinafter.

Figure 1:
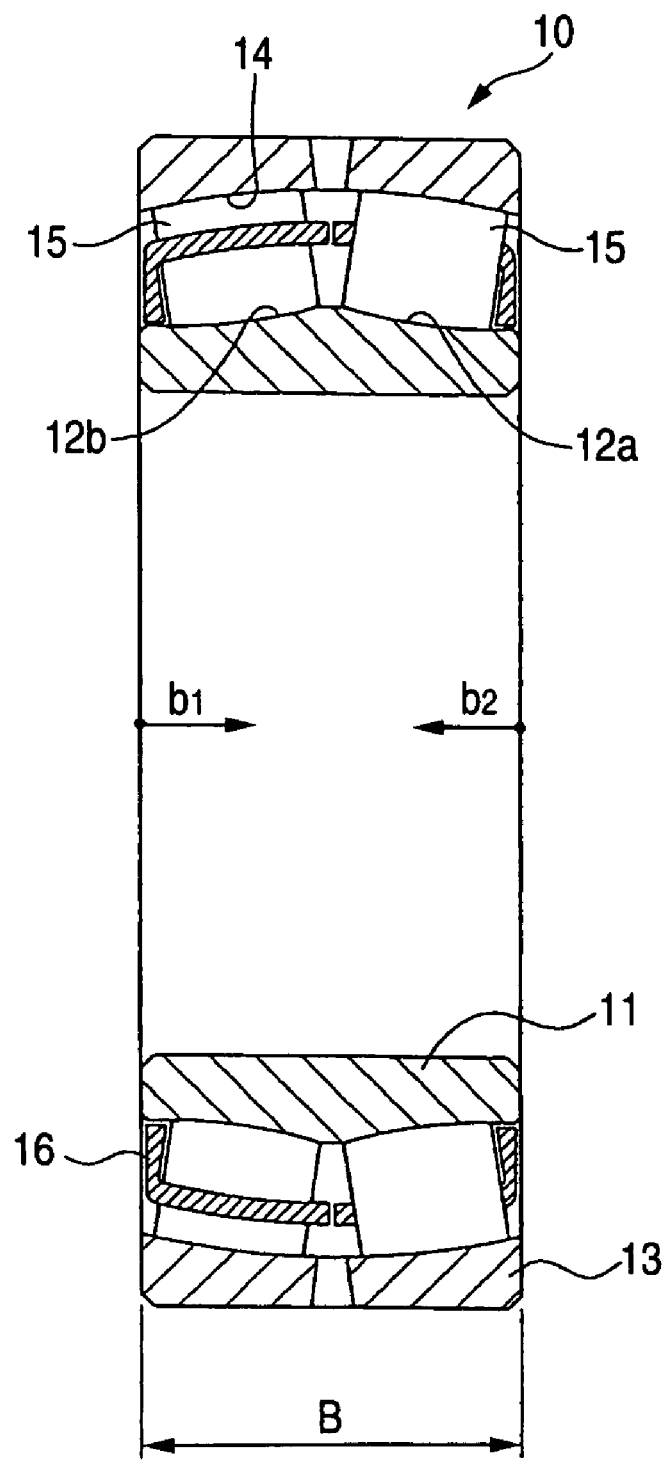
FIG. 1 is an axial sectional view of a self-aligning roller bearing according to a first embodiment of the present invention.

FIG. 1 is an axial sectional view of a self-aligning roller bearing according to a first embodiment of the present invention. In FIG. 1, a self-aligning roller bearing 10 according to the first embodiment of the present invention has an inner ring 11. Double row raceways (also referred to as "inner ring raceway surfaces" hereinafter) 12a, 12b are formed on an outer peripheral surface of the inner ring 11 along the circumferential direction of the inner ring 11. Also, the self-aligning roller bearing 10 has an outer ring 13. A double row integral spherical raceway (also referred to as an "outer ring raceway surface" hereinafter) 14 is formed on an inner peripheral surface of the outer ring 13 along the circumferential direction of the outer ring 13.

The inner ring raceway surfaces 12a, 12b and the outer ring raceway surface 14 are opposed to each other. A plurality of rollers 15 are provided between the inner ring raceway surface 12a and the outer ring raceway surface 14 and between the inner ring raceway surface 12b and the outer ring raceway surface 14 respectively. These rollers 15 are held in a retainer 16. Respective peripheral surface portions are formed like a circular arc to have the almost same radius of curvature as those of the inner ring raceway surfaces 12a, 12b and the outer ring raceway surface 14.

A surface roughness of the outer ring raceway surface 14 is made more coarsely than a surface roughness of the inner ring raceway surfaces 12a, 12b (normally 0.05 μm to 0.15 μm. Then, the outer ring raceway surface 14 is subjected to the grinding while setting the rotation axis of the grindstone (not shown) in parallel with a central axis of the outer ring 13, and then is subjected to the super finishing while swinging the grindstone along the axial direction of the outer ring 13. An average roughness Ra in the axial direction and the circumferential direction is given as 0.1 μm≦Ra≦0.5 μm in ranges of $b_1/(B/2)≦0.9$, $b_2/(B/2)≦0.9$ within a measured length of 0.1 mm to 1.0 mm, where B is a width of the outer ring 13 and $b_1$, $b_2$ are a distance from both end surfaces of the outer ring 13 respectively.

In this way, if an average roughness Ra of the outer ring raceway surface 14 in the axial direction and the circumferential direction is set to 0.1 µm≦Ra≦0.5 µm in the ranges of $b_1/(B/2)$≦0.9, $b_2/(B/2)$≦0.9 and within the measured length of 0.1 mm to 1.0 mm, a variation of the local roughness is reduced in the overall area of the outer ring raceway surface 14, which comes into contact with the roller 15, and also a coefficient of friction of the outer ring raceway surface 14 to the roller 15 is stably increased. As a result, an extension of the lifetime can be achieved by suppressing an early flaking caused due to the surface damage such as the peeling, or the like.

Also, in the above embodiment, since the outer ring raceway surface 14 is subjected to the grinding while setting the rotation axis of the grindstone in parallel with the central axis of the outer ring 13 and then is subjected to the super finishing while swinging the grindstone along the axial direction of the outer ring 13, the grinding trace is formed on the outer ring raceway surface 14 like a mesh pattern, as shown in FIG. 2(c). That is, machining traces that intersect with each other are formed on the outer ring raceway surface 14 by the super finishing. Accordingly, since the outer ring raceway surface a variation of the roughness of which is reduced can be formed, the lifetime of the self-aligning roller bearing can be prolonged more effectively. Where θ in FIG. 2(c) is an intersection angle of the machining traces in the circumferential direction. If the intersection angle of the machining traces is set within a range of 90° to 150° to the circumferential direction of the raceway surface, the roughness can be formed more closely in the circumferential direction and the axial direction mutually.

As the grinding method of the outer ring raceway surface, normally there are the method of applying the grinding while keeping the rotation axis of the grindstone in parallel with the central axis of the outer ring (referred to as a "straight grinding" hereinafter) and the method of applying the grinding by using a cup-like grindstone having a diameter that is larger than a width of the outer ring (referred to as a "cup-grindstone grinding" hereinafter). According to the straight grinding out of them, the grinding trace formed on the outer ring raceway surface gives a linear pattern in parallel with the circumferential direction of the outer ring, as shown in FIG. 2(a). Therefore, when the roughness of the outer ring raceway surface is measured along the axial direction of the outer ring, measured values are larger than the case where the roughness is measured along the circumferential direction of the outer ring. However, since a frictional force generated when the roller is rolled on the outer ring raceway surface acts in the circumferential direction of the outer ring, the roughness of the outer ring raceway surface detected when such roughness is measured along the axial direction of the outer ring has a little effect on an increase of the coefficient of friction in contrast to the roughness detected when such roughness is measured along the circumferential direction of the outer ring. Also, when the average roughness Ra measured along the axial direction of the outer ring is large, such roughness has an effect of increasing the coefficient of friction. However, when the average roughness Ra is too large, unevenness on the outer ring raceway surface becomes large in contrast to a thickness of an oil film, and thus the lubrication condition becomes worse and the lifetime is liable to be short.

In contrast, since the cup-grindstone grinding gives the grinding method applied while setting the rotation axis of the cup-like grindstone perpendicular to the central axis of the outer ring, the grinding trace is formed on the outer ring raceway surface like a curve-like pattern that has a center portion of the outer ring as a vertex, as shown in FIG. 2(b). Therefore, when the roughness of the outer ring raceway surface is measured along the axial direction of the outer ring, the grinding trace has an inclination on end portions of the outer ring raceway surface from the axial direction and the circumferential direction and thus the average roughness Ra becomes large as in the case where the roughness is measured along the circumferential direction of the outer ring. Also, in the case of the cup-grindstone grinding, the coefficient of friction can be increased much more because the grinding traces intersect with each other near the end portions of the outer ring raceway surface, but the grinding traces become almost parallel with the axial direction of the outer ring near the center portion of the outer ring raceway surface. For this reason, the average roughness Ra becomes large when such roughness is measured along the circumferential direction of the outer ring, while the average roughness Ra does not become so large when such roughness is measured along the axial direction of the outer ring. The cup-grindstone grinding can suppress a rotation slip by increasing the coefficient of friction in the circumferential direction of the outer ring rather than the straight grinding, nevertheless the coefficient of friction near the center portion of the outer ring raceway surface becomes smaller than the coefficient of friction near the end portions when the outer ring raceway surface is ground with the cup-like grindstone. Therefore, the coefficient of friction is varied according to the position of the outer ring raceway surface, and a rolling motion of the roller becomes unstable.

On the contrary, like the present embodiment, if the outer ring raceway surface is subjected to the grinding while holding the rotation axis of the grindstone in parallel with the central axis of the outer ring and then is subjected to the super finishing while swinging the grindstone along the axial direction of the outer ring, the grinding trace is formed on the outer ring raceway surface like a mesh pattern, as shown in FIG. 2(c), and thus the outer ring raceway surface a variation of the roughness of which is reduced can be formed. As a result, the lifetime of the self-aligning roller bearing can be prolonged more effectively.

In order to check the above effect, the inventors of the present invention conducted the life test of the self-aligning roller bearing under test conditions of the number of revolution: 1500 min$^{-1}$, the test load: 45217 N, and the lubrication condition: RO68. Also, the inventors of the present invention measured the average roughness Ra of the outer ring raceway surface under following measuring conditions 1 to 3 prior to the life test. In this case, the life test was ended at a lifetime ratio of 26.3.

Measuring condition 1: measured length: l=0.15 mm, measured direction: outer ring axial direction, and measured location: overall outer ring raceway surface Measuring condition 2: measured length: l=0.5 mm, measured direction: outer ring axial direction, and measured location: $b_1/(B/2)$=0.7

Measuring condition 3: measured length: l=0.5 mm, measured direction: outer ring circumferential direction, and measured location: $b_1/(B/2)$=0.4

Test results of the above life test and measured results of the average roughness are given in Table 1.

TABLE 1

|  |  |  | Average Roughness of outer ring Ra (μm) | | | Lifetime |
|---|---|---|---|---|---|---|
|  |  | (A) | (B) | (C) | (D) | ratio |
| TB1 | EMB | FIG. 2(c) | 0.392 | 0.408 | 0.375 | 18.9 |
| TB2 | EMB | FIG. 2(c) | 0.314 | 0.323 | 0.305 | 23.4 |
| TB3 | EMB | FIG. 2(c) | 0.370 | 0.351 | 0.389 | 26.3→ |
| TB4 | EMB | FIG. 2(c) | 0.326 | 0.339 | 0.312 | 26.3→ |
| TB5 | EMB | FIG. 2(c) | 0.321 | 0.311 | 0.330 | 26.3→ |
| TB6 | EMB | FIG. 2(c) | 0.311 | 0.344 | 0.341 | 26.3→ |
| TB7 | EMB | FIG. 2(c) | 0.324 | 0.332 | 0.316 | 26.3→ |
| TB8 | C.E | FIG. 2(a) | 0.340 | 0.321 | 0.093 | 10.0 |
| TB9 | C.E | FIG. 2(a) | 0.345 | 0.335 | 0.047 | 10.1 |
| TB10 | C.E | FIG. 2(a) | 0.350 | 0.340 | 0.060 | 5.7 |
| TB11 | C.E | FIG. 2(a) | 0.334 | 0.371 | 0.070 | 1.0 |
| TB12 | C.E | FIG. 2(a) | 0.300 | 0.366 | 0.050 | 3.5 |
| TB13 | C.E | FIG. 2(a) | 0.307 | 0.382 | 0.097 | 4.6 |
| TB14 | C.E | FIG. 2(b) | 0.351 | 0.089 | 0.358 | 6.8 |
| TB15 | C.E | FIG. 2(b) | 0.283 | 0.052 | 0.283 | 6.8 |
| TB16 | C.E | FIG. 2(b) | 0.358 | 0.056 | 0.358 | 4.2 |
| TB17 | C.E | FIG. 2(b) | 0.255 | 0.061 | 0.255 | 6.8 |
| TB18 | C.E | FIG. 2(b) | 0.361 | 0.068 | 0.361 | 8.1 |
| TB19 | C.E | FIG. 2(b) | 0.341 | 0.075 | 0.341 | 13.6 |
| TB20 | EMB | FIG. 2(c) | 0.127 | 0.133 | 0.104 | 16.4 |
| TB21 | EMB | FIG. 2(c) | 0.476 | 0.487 | 0.480 | 15.5 |
| TB22 | C.E | FIG. 2(c) | 0.060 | 0.092 | 0.083 | 4.0 |
| TB23 | C.E | FIG. 2(c) | 0.512 | 0.547 | 0.524 | 3.2 |

*)→ indicates the bearing whose test was interrupted without flaking
(A): Schematic view of the roughness shape
(B): Measuring condition 1 measured length: l = 15 mm, measured direction: outer ring axial direction, measured location: overall outer ring raceway surface
(C): Measuring condition 2 measured length: l = 0.5 mm, measured direction: outer ring axial direction, measured location: $b_1/(B/2) = 0.7$
(D): Measuring condition 3 measured length: l = 0.5 mm, measured direction: outer ring circumferential direction, measured location: $b_1/(B/2) = 0.4$
EMB: Embodiment
C.E: comparative Example In Table 1, TB1 to TB7 and TB20 to TB23 show a test bearing whose outer ring raceway surface is processed by the method in FIG. 2(c) respectively, TB8 to TB13 show a test bearing whose outer ring raceway surface is processed by the straight grinding in FIG. 2(a) respectively, and TB14 to TB19 show a test bearing whose outer ring raceway surface is processed by the cup- grindstone grinding in FIG. 2(b) respectively. In this case, the self-aligning roller bearing manufactured by Nippon Seiko K.K. (the model number 22211, the outer diameter: 100 mm, the inner diameter: 55 mm, the width: 25 mm) was used as the test bearing.

As shown in Table 1, in case the average roughness of the outer ring raceway surface is measured under the measuring condition 1, the test bearings TB1 to TB19 show the almost identical value of the average roughness, but the lifetime ratio of the test bearings TB8 to TB19 (a lifetime ratio obtained under the assumption that a lifetime of the test bearing TB11 is set to 1) shows a small value in contrast to the lifetime ratio of the test bearings TB1 to TB7. Also, in case the average roughness of the outer ring raceway surface is measured under the measuring condition 2, the test bearings TB1 to TB13 show the almost identical value of the average roughness, but the lifetime ratio of the test bearings TB8 to TB13 shows a small value in contrast to the lifetime ratio of the test bearings TB1 to TB7. In addition, in case the average roughness of the outer ring raceway surface is measured under the measuring condition 3, the test bearings TB1 to TB7 and TB14 to TB19 show the almost identical value of the average roughness, but the lifetime ratio of the test bearings TB14 to TB19 shows a small value in contrast to the lifetime ratio of the test bearings TB1 to TB7. From the above, it is appreciated that the test bearings TB1 to TB7 out of the test bearings TB1 to TB19 can provide the self-aligning roller bearing a lifetime of which is longer than that of the test bearings TB8 to TB19.

In the comparison between the test bearing TB20 and the test bearing TB22, the test bearing TB20 shows the almost same value (about 0.1 μm) of the average roughness as the test bearing TB22, while the lifetime ratio of the test bearing TB22 shows a small value rather than that of the test bearing TB20. From this fact, it is appreciated that the lifetime of the self-aligning roller bearing is reduced if the average roughness of the outer ring raceway surface becomes smaller than 0.1 μm.

In the comparison between the test bearing TB21 and the test bearing TB23, the test bearing TB21 shows the almost same value (about 0.5 μm) of the average roughness as the test bearing TB23, while the lifetime ratio of the test bearing TB23 shows a small value rather than that of the test bearing TB21. From this fact, it is appreciated that the lifetime of the self-aligning roller bearing is reduced if the average roughness of the outer ring raceway surface exceeds 0.5 μm.

FIG. 3 is a view showing a relationship between the average roughness and the lifetime ratio in the test bearings TB1 to TB23. In FIG. 3, (a) shows a relationship between the average roughness and the lifetime ratio when the roughness of the outer ring raceway surface is measured under the measuring condition 2, and (b) shows a relationship between the average roughness and the lifetime ratio when the roughness of the outer ring raceway surface is measured under the measuring condition 3.

As apparent from FIG. 3, it can be understood that the test bearings TB1 to TB7, TB20 and TB21 out of the test bearings TB1 to TB23 have the average roughness within a range of 0.1 μm to 0.5 μm in ranges of $b_1/(B/2)=0.7$ and $b_1/(B/2)=0.4$ whereas the test bearings TB8 to TB19, TB22 and TB23 have the average roughness out of the range of 0.1 μm to 0.5 μm in ranges of $b_1/(B/2)=0.7$ and $b_1/(B/2)=0.4$. In this case, the reason why the measured ranges are set to $b_1/(B/2)=0.7$ and $b_1/(B/2)=0.4$ in this roughness measurement is that the neighborhood of the position, to which the maximum face pressure is applied, corresponds to $b_1/(B/2)=0.4$ when the self-aligning roller bearing receives the radial load and also the neighborhood of the position, to which the maximum face pressure is applied, corresponds to $b_1/(B/2)=0.7$ when the inner ring and the roller receive the axial load and the moment load and incline.

Figure 4:
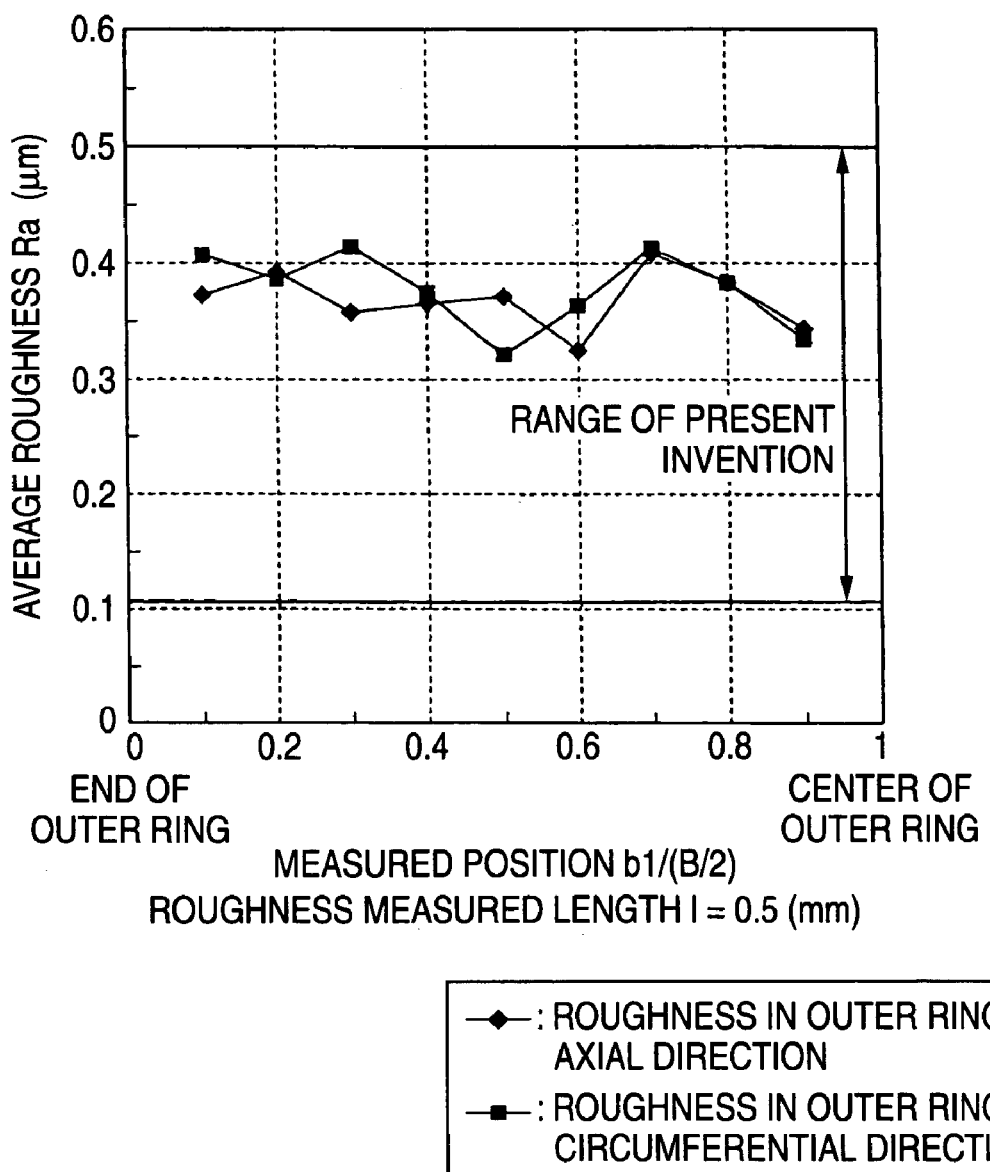
FIG. 4 is a view showing measured results obtained when a roughness of an outer ring raceway surface of the test bearing is measured under the conditions of $b_1/(B/2)=0.1$ to 0.9 and a measured length $l=0.5$ mm.
Figure 10:
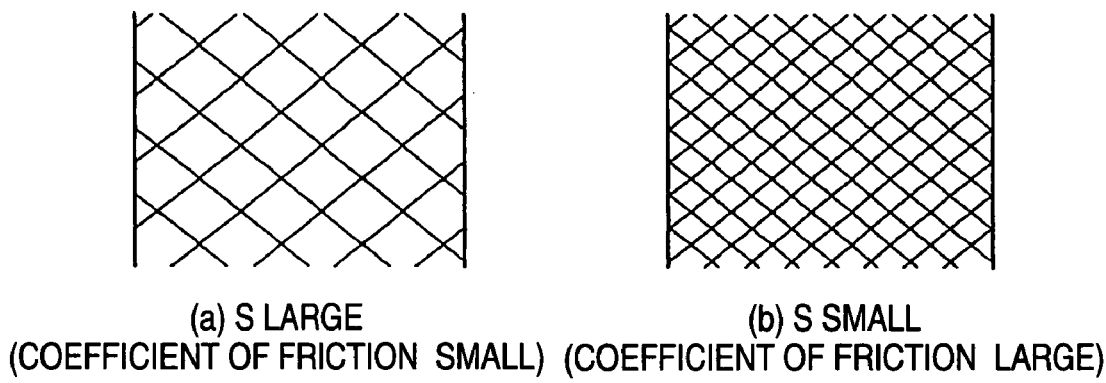
FIG. 10 is view showing schematically a roughness pattern of the outer ring raceway surface.
Figure 11:
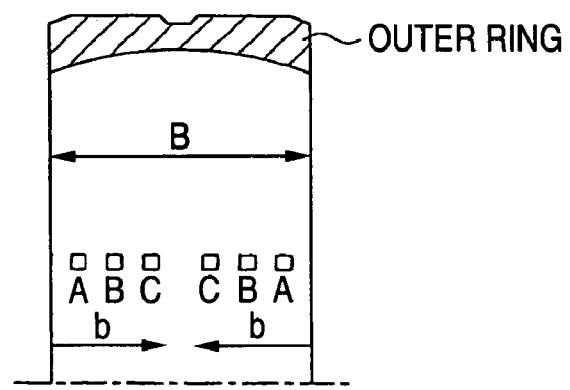
FIG. 11 is view showing schematically measuring positions of an average roughness and the roughness parameter of the outer ring raceway surface.

Measured results obtained when the roughness of the outer ring raceway surface of the test bearing TB1 is measured under the conditions of $b_1/(B/2)=0.1$ to 0.9 and the measured length l=0.5 mm are shown in FIG. 4. In FIG. 4, ♦ denotes the roughness in the axial direction of the outer ring, and ■ denotes the roughness in the circumferential direction of the outer ring.

As shown in FIG. 4, it is appreciated that, when the roughness of the outer ring raceway surface is measured under the measuring condition of $0.1 \leq b_1/(B/2) \leq 0.9$, the average roughness Ra of the outer ring raceway surface in the axial direction and the circumferential direction is within a range of $0.1 \mu m \leq Ra \leq 0.5 \mu m$.

FIG. 5 is a view showing a relationship between the roughness in the circumferential direction and the roughness in the axial direction of the test bearings TB1 to TB23. As shown in FIG. 5, the average roughness of the test bearings TB1 to TB7, TB20 and TB21 out of the test bearings TB1 to TB23 is within a range of 0.1 μm to 0.5 μm in both the axial direction and the circumferential direction, but the average roughness of the test bearings TB8 to TB19, TB22 and TB23 is out of a range of 0.1 μm to 0.5 μm in both the axial direction and the circumferential direction.

With the above, if the average roughness Ra of the outer ring raceway surface in the axial direction and the circumferential direction is set within a range of 0.1 μm to 0.5 μm in the ranges of $b_1/(B/2) \leqq 0.9$, $b_1/(B/2) \leqq 0.9$ and within the measured length of 0.1 mm to 1.0 mm, the self-aligning roller bearing capable of attaining an extension of the lifetime by suppressing the early flaking caused due to the surface damage such as the peeling, or the like can be obtained. More preferably, if the average roughness Ra of the outer ring raceway surface in the axial direction and the circumferential direction is set within a range of 0.2 μm to 0.4 μm, the lifetime of the self-aligning roller bearing can be further prolonged as given in Table 1.

Also, the inventors of the present invention are conducting earnestly a study of the lifetime enhancement of the self-aligning roller bearing. As a result, the inventors of the present invention made findings that, if the coefficient of friction at the contact portion between the outer ring raceway surface and the roller is increased by enlarging the roughness of the outer ring raceway surface for the purpose of suppressing the rotation slip of the roller, the lifetime enhancement of the self-aligning roller bearing can be achieved by suppressing the peeling, but it is important to reduce an interval of the unevenness as an interval (lateral) parameter of a roughness curve because it is not enough just to increase the coefficient of friction by simply increasing the value of the average roughness Ra as an amplitude (vertical) parameter of the roughness curve of the outer ring raceway surface.

More particularly, as shown in FIG. 6, a roughness parameter S is defined by $$S = \frac{1}{n} \sum_{i=1}^{n} S_i \quad (1)$$

where l is the measured length of a roughness curve C indicating the roughness of the outer ring raceway surface, n is the number of peaks of the roughness of the roughness curve, and Si is an interval between adjacent peaks of the roughness curve C. If this roughness parameter S is set to $0 < S \leqq 20$ μm, the coefficient of friction at the contact portion between the outer ring raceway surface and the roller can be increased and then the slip of the roller can be suppressed. Thus, the early flaking caused due to the surface damage such as the peeling, or the like can be suppressed, so that the lifetime enhancement of the self-aligning roller bearing can be achieved.

FIG. 7 is view showing schematically the contact condition between the outer ring raceway surface and the roller in both the case where the roughness parameter S of the outer ring raceway surface is large and the case where such parameter S is small. As evident from FIG. 7, in case the roughness parameter S of the outer ring raceway surface is small, the number of peaks of the roughness of the outer ring raceway surface, which contact the rollers, is increased rather than the case where the roughness parameter S is large. Therefore, the coefficient of friction at the contact portion between the outer ring raceway surface and the roller is increased and the slip of the roller is suppressed.

Actually measured results of the coefficient of friction at the contact portion between the outer ring raceway surface and the roller when the roughness parameter S of the outer ring raceway surface is large and when such parameter S is small are shown in FIG. 8. As apparent from FIG. 8, in the situation that the average roughness Ra is substantially equal to each other, the coefficient of friction at the contact portion between the outer ring raceway surface and the roller becomes larger if the roughness parameter S is smaller. Here, a ratio of the coefficient of friction in FIG. 8 is a relative value derived when the coefficient of friction having the larger roughness parameter S is assumed as 1.

FIG. 9 is view showing schematically the lubrication condition in both the case where the coefficient of friction at the contact portion between the outer ring raceway surface and the roller is increased by increasing the average roughness S of the outer ring raceway surface and the case where the coefficient of friction at the contact portion between the outer ring raceway surface and the roller is increased by reducing the roughness parameter S of the outer ring raceway surface. As shown in FIG. 9, when the coefficient of friction at the contact portion between the outer ring raceway surface and the roller is increased by increasing the average roughness S of the outer ring raceway surface, the lubrication condition is worsened and thus the lifetime of the self-aligning roller bearing is shortened. In contrast, when the coefficient of friction at the contact portion between the outer ring raceway surface and the roller is increased by reducing the roughness parameter S of the outer ring raceway surface, the unevenness of the roughness with respect to a oil film thickness (oil film parameter) is not changed even though the coefficient of friction at the contact portion between the outer ring raceway surface and the roller is increased. Therefore, the lifetime of the self-aligning roller bearing is by no means shortened owing to the deteriorated lubrication condition.

In order to check the foregoing effect, the inventors the present invention carried out the life test of the self-aligning roller bearing under test conditions of the number of revolution: 1500 min$^{-1}$, the test load: 45217 N, and the lubrication condition: VG68 while employing the self-aligning roller bearing (the model number 22211, the outer diameter: 100 mm, the inner diameter: 55 mm, the width: 25 mm) manufactured by Nippon Seiko K.K. as the test bearing, and also measured the average roughness Ra of the outer ring raceway surface and the roughness parameter S prior to the life test.

Test results of the above lift test and measured results of the average roughness Ra and the roughness parameter S are given in Table 2.

TABLE 2

| | | | Average Roughness of outer ring Ra (μm) | | | | | | | Lifetime |
|---|---|---|---|---|---|---|---|---|---|---|
| | | | (B) | | (C) | | (D) | | (E) | |
| | | (A) | S | Ra | S | Ra | S | Ra | S | Ra | ratio |
| TB31 | EMB 1 | FIG. 10(b) | 6.8 | 0.260 | 6.7 | 0.285 | 8.1 | 0.293 | 7.2 | 0.279 | 10.8 |
| TB32 | EMB 2 | FIG. 10(b) | 6.5 | 0.453 | 6.6 | 0.420 | 6.6 | 0.473 | 6.6 | 0.449 | 13.4 |

TABLE 2-continued

| | | | Average Roughness of outer ring Ra (μm) | | | | | | | Lifetime |
| | | | (B) | | (C) | | (D) | | (E) | |
| | | (A) | S | Ra | S | Ra | S | Ra | S | Ra | ratio |
|---|---|---|---|---|---|---|---|---|---|---|---|
| TB33 | EMB 3 | FIG. 10(b) | 6.4 | 0.324 | 7.0 | 0.350 | 6.5 | 0.340 | 6.6 | 0.338 | 15.0→ |
| TB34 | EMB 4 | FIG. 10(b) | 6.9 | 0.289 | 6.8 | 0.299 | 6.9 | 0.259 | 6.9 | 0.282 | 15.0→ |
| TB35 | EMB 5 | FIG. 10(b) | 8.0 | 0.326 | 7.5 | 0.374 | 7.6 | 0.353 | 7.7 | 0.351 | 15.0→ |
| TB36 | EMB 6 | FIG. 10(b) | 7.6 | 0.326 | 6.9 | 0.319 | 6.7 | 0.331 | 7.1 | 0.325 | 15.0→ |
| TB37 | EMB 7 | FIG. 10(b) | 8.4 | 0.378 | 8.6 | 0.356 | 7.5 | 0.376 | 8.2 | 0.370 | 15.0→ |
| TB38 | C.E 1 | FIG. 10(a) | 21.8 | 0.315 | 20.8 | 0.363 | 21.9 | 0.345 | 21.5 | 0.341 | 3.2 |
| TB39 | C.E 2 | FIG. 10(a) | 22.6 | 0.384 | 23.0 | 0.361 | 21.7 | 0.364 | 22.4 | 0.370 | 3.5 |
| TB40 | C.E 3 | FIG. 10(a) | 21.6 | 0.341 | 21.7 | 0.377 | 22.9 | 0.389 | 22.1 | 0.369 | 2.4 |
| TB41 | C.E 4 | FIG. 10(a) | 21.7 | 0.344 | 23.2 | 0.339 | 23.7 | 0.343 | 22.9 | 0.342 | 4.8 |
| TB42 | C.E 5 | FIG. 10(a) | 22.9 | 0.319 | 21.6 | 0.375 | 24.0 | 0.335 | 22.8 | 0.343 | 1.0 |
| TB43 | C.E 6 | FIG. 10(a) | 23.1 | 0.380 | 23.5 | 0.387 | 21.8 | 0.314 | 22.8 | 0.360 | 2.5 |
| TB44 | C.E 7 | FIG. 10(a) | 21.6 | 0.307 | 20.4 | 0.322 | 21.5 | 0.320 | 21.2 | 0.316 | 5.6 |
| TB45 | EMB 8 | FIG. 10(b) | 14.7 | 0.349 | 14.0 | 0.392 | 15.9 | 0.392 | 14.9 | 0.378 | 12.5 |
| TB46 | EMB 9 | FIG. 10(b) | 20.0 | 0.336 | 19.2 | 0.355 | 18.8 | 0.366 | 19.3 | 0.352 | 9.3 |

*)→ indicates the bearing whose test was interrupted without flaking
(A): Schematic view of the roughness shape
(B): Measuring position A
(C): Measuring position B
(D): Measuring position C
(E): Average values of measuring positions A, B, C
EMB: Embodiment
C.E: comparative Example In Table 2, the test bearings TB31 to 37 and TB45, TB46 indicate the test bearing, the outer ring raceway surface of which has a roughness pattern shown in FIG. 10(b), (the self-aligning roller bearing whose outer ring raceway surface is ground while holding the rotation axis of the grindstone in parallel with the central axis of the outer ring and then whose outer ring raceway surface is subjected to the super finishing by swinging the grindstone in the axial direction of the outer ring) respectively. Also, the test bearings TB38 to 44 indicate the test bearing whose outer ring raceway surface has a roughness pattern shown in FIG. 10(a) (the self-aligning roller bearing whose outer ring raceway surface is ground while holding the rotation axis of the grindstone in parallel with the central axis of the outer ring and then whose outer ring raceway surface is subjected to the super finishing by swinging the grindstone in the axial direction of the outer ring) respectively. Also, the average roughness Ra and the roughness parameter S in Table 2 correspond to the values measured in positions illustrated in FIG. 11. Here, in FIG. 11, measured positions A and C are considered as the position to which the maximum face pressure is applied when the inner ring and the rollers are inclined by the application of the axial load and the moment load, and a measured position B is considered as the position to which the maximum face pressure is applied when the bearing is subjected to the pure radial load. Also, the lifetime ratio in Table 2 is represented by a relative value derived when the value in Comparative Example 5 in which the shortest lifetime is given is assumed as 1. The life test was ended at the lifetime ratio of 15.0.

Figure 12:
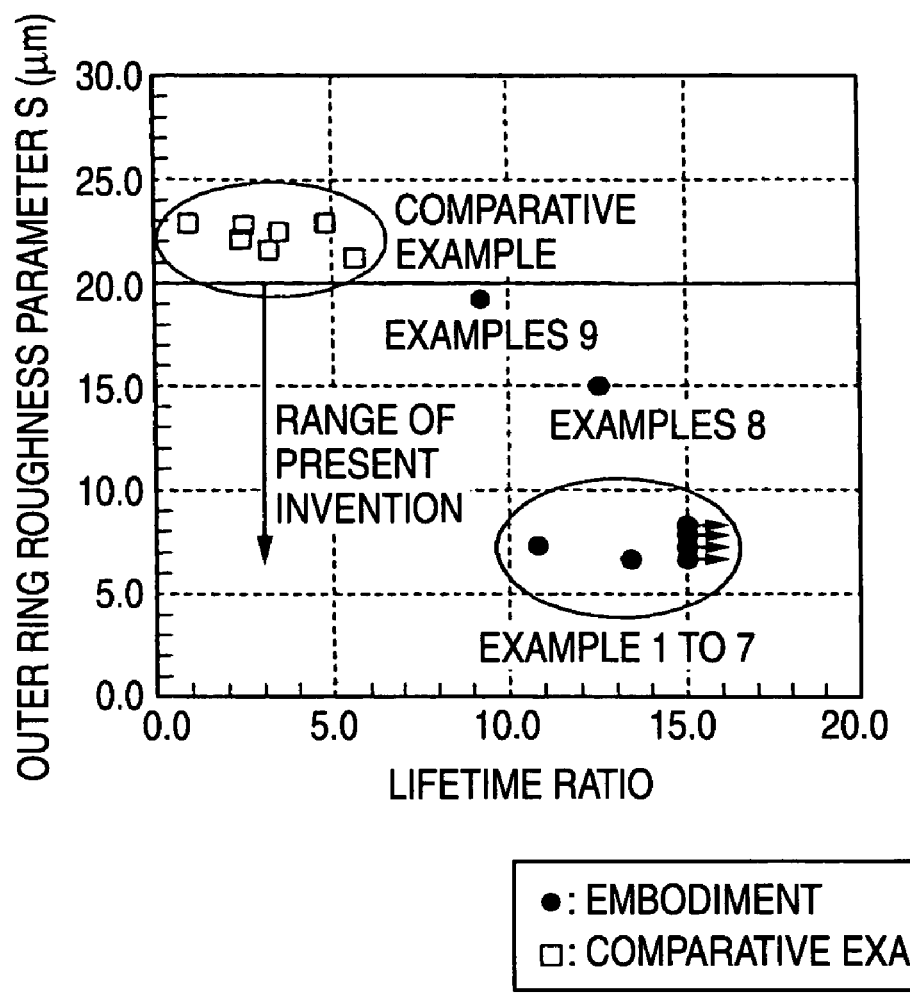
FIG. 12 is a view showing a relationship between the roughness parameter and the lifetime ratio in Table 2.

A relationship between the roughness parameter S and the lifetime ratio in Table 2 is shown in FIG. 12. As shown in FIG. 12, the average roughness Ra of the outer ring raceway surface is within a range of 0.25 to 0.40 μm in Embodiments 1 to 9 and Comparative Examples 1 to 7, but Comparative Examples 1 to 7 have the shorter lifetime than Embodiments 1 to 9. This is because the roughness parameters of the outer ring raceway surface is 20 μm in Embodiments 1 to 9 whereas the roughness parameter S is in excess of 20 μm in Comparative Example 1.

As evident from the above, since the roughness parameter S defined by Eq. (1) is set to $0 < S \leq 20$ μm, the coefficient of friction at the contact portion between the outer ring raceway surface and the roller can be increased and the slip of the roller can be suppressed. Therefore, the lifetime enhancement of the self-aligning roller bearing can be attained by suppressing the early flaking caused due to the surface damage such as the peeling, or the like. The satisfactory results of the roughness of the outer ring can be obtained if the value of Ra is in a range of 0.1 to 0.5 μm and the value of S is 20 μm or less. More preferably, if the value of S is set to 15 μm or less, the lifetime of the self-aligning roller bearing can be further extended as given in Table 2. Also, it is desired that, in order to get the coefficient of friction stably and highly at the contact portion between the outer ring raceway surface and the roller, the average roughness Ra in the circumferential direction and the axial direction should be set to Ra=0.25 to 0.4 μm. Also, judging from the minimum grain size of the grindstone, or the like, a lower limit value of S may be considered as about S=0.01 μm.

Next, a second embodiment of the present invention will be explained with reference to FIGS. 13 to 19 hereinafter.

Figure 13:
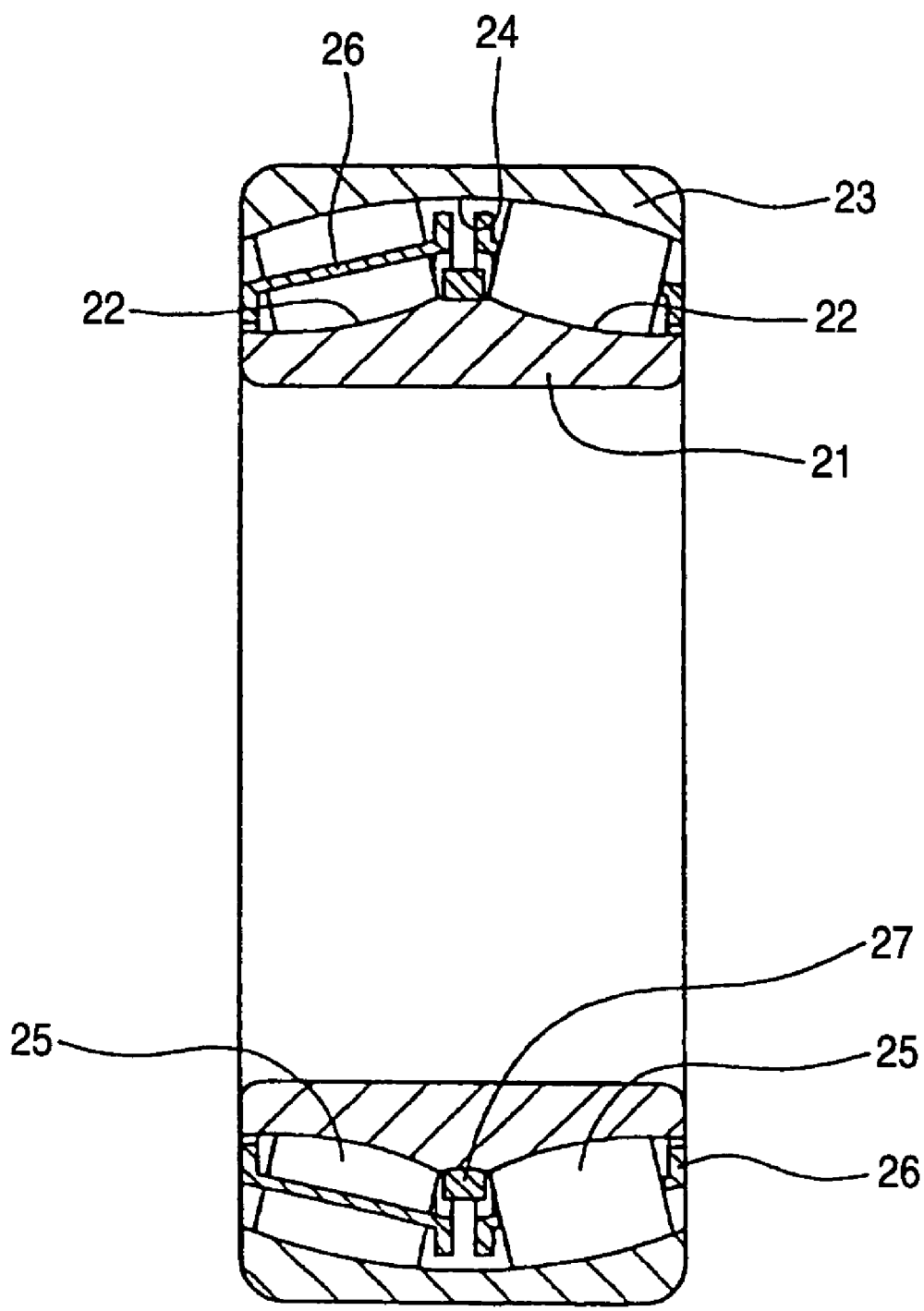
FIG. 13 is an axial sectional view of a self-aligning roller bearing according to a second embodiment of the present invention.

FIG. 13 is an axial sectional view of a self-aligning roller bearing according to a second embodiment of the present invention. In FIG. 13, in the self-aligning roller bearing according to the second embodiment of the present invention, double row convex rollers 25 as the rolling elements are arranged rollably in the circumferential direction between an inner ring 21 having double row raceways (also referred to as "inner ring raceway surfaces" hereinafter) 22 and an outer ring 23 having a double row integral spherical raceway (also referred to as an "outer ring raceway surface" hereinafter) 24 via a retainer 26. A guide ring 27 is provided between the double row raceways 22 of the inner ring 21, and a raceway diameter of the inner ring 21 is set large in the center portion rather than both end portions in the axial direction.

The inventors of the present invention are conducting earnestly the study of the lifetime enhancement of the self-aligning roller bearing. As a result, the inventors of the present invention made the finding that the fracture peculiar to the above self-aligning roller bearing is not directly caused by the skew of the rolling element but caused by a tangential force that acts between the inner and outer rings and the rolling elements. Then, the inventors of the present invention also made the finding that the fracture is caused by the flaking that is started from a minute plastic flow, which serves as a starting point and is generated on the surface of the inner ring when a large tangential force acts. The minute plastic flow is generated in vicinity of the surface when the tangential force acts. Thus, not only is the spread of the peeling crack promoted but also a maximum shearing stress position is exposed to the surface to thus increase a value of a shearing stress. In other words, the tangential force has the enormous adverse influence on the lifetime of the bearing.

Also, the inventors of the present invention also made the findings that there are the direction along which the tangential force exerts an adverse influence on the lifetime (the same direction as the rolling direction) and the direction along which the tangential force has little influence on the lifetime (the opposite direction to the rolling direction) and that the crack is ready to occur and widen (on the slow circumferential speed side) when the tangential force acts in the same direction as the rolling direction.

Therefore, in order to attain the lifetime enhancement of the self-aligning roller bearing, it is important to suppress the tangential force acting on the inner ring as the major broken portion in the rolling direction. Thus, the inventors of the present invention came up to the completion of the present invention, keeping their eyes on optimization of a roughness balance between the inner and outer rings and the rolling elements as a means for suppressing the tangential force.

In the concrete, the tangential force acting on the inner ring is increased in the case where (A): the face pressure is large, (B): the roughness of the rolling contact surface of the rolling element and the inner ring raceway surface are large, and (C): the slip (difference in the circumferential speed) between the inner ring and the rolling element is large.

The face pressure in (A) is almost decided depending on the application conditions. Therefore, in order to suppress the tangential force acting on the inner ring, either the approach of suppressing the roughness of the rolling contact surface of the rolling element and the inner ring raceway surface as the measure for (B) or the approach of suppressing the slip between the inner ring and the rolling element by reducing the rotation speed of the rolling element to bring the rolling element close to a pure rolling state as the measure for (C) may be considered.

First, the critical meanings of numerical values in (B) will be explained in detail hereunder.

Figure 14:
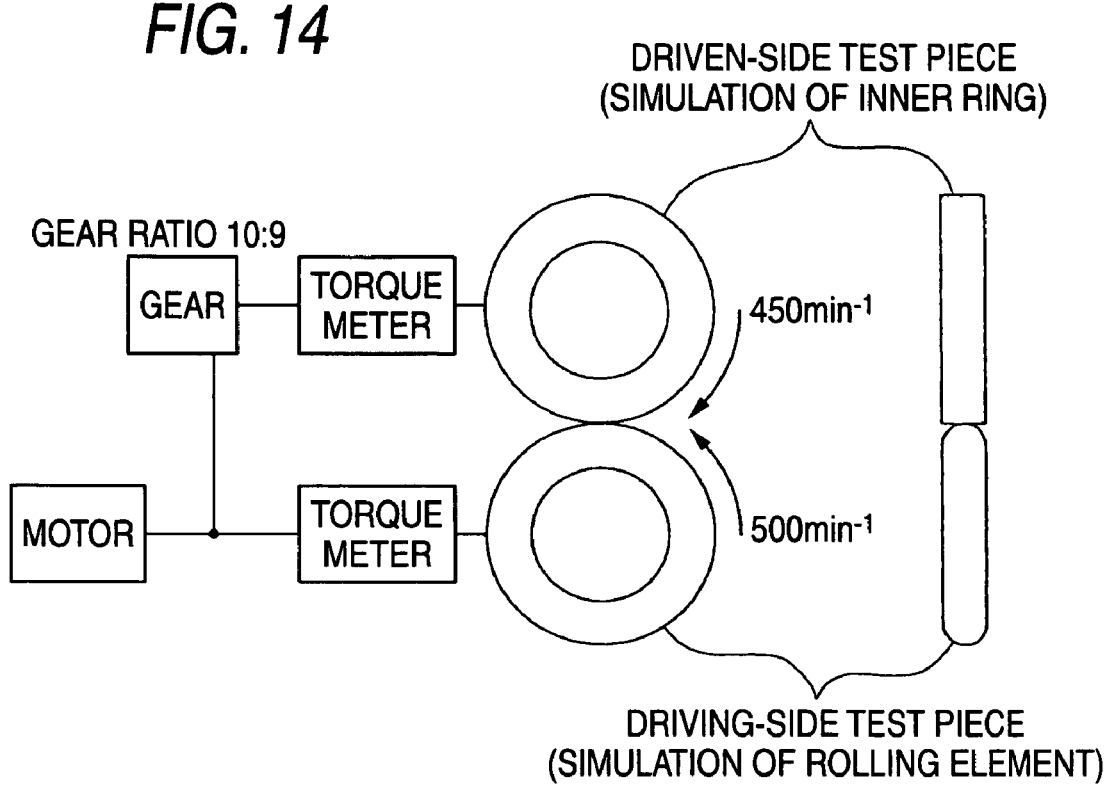
FIG. 14 is a schematic view of a two-cylinder testing machine.

In order to investigate the influence of the surface roughness of the inner ring and the rolling element in the self-aligning roller bearing on the tangential force, while employing a two-cylinder testing machine shown in FIG. 14, the tangential force was measured by measuring a friction torque by means of torque meters fitted to the supporting shafts. Measuring conditions were set to the maximum face pressure $P_{max}$=3.2 Gpa, the slip ratio: 10%, and the lubrication oil: RO68.

As the result of the measurement and the calculation of the circumferential speed of the inner ring and the circumferential speed of the rolling element in the self-aligning roller bearing, the circumferential speed of the rolling element was in excess of the circumferential speed of the inner ring. Therefore, a test piece used to simulate the rolling element is fitted to the driving side and a test piece used to simulate the inner ring is fitted to the driven side, and then a speed of revolution of a driven-side test piece is reduced by the gears (gear ratio 10:9). Thus, the number of revolution of a driving-side test piece is set to 500 $min^{-1}$ and also the number of revolution of the driven-side test piece is set to 450 $min^{-1}$.

Figure 15:
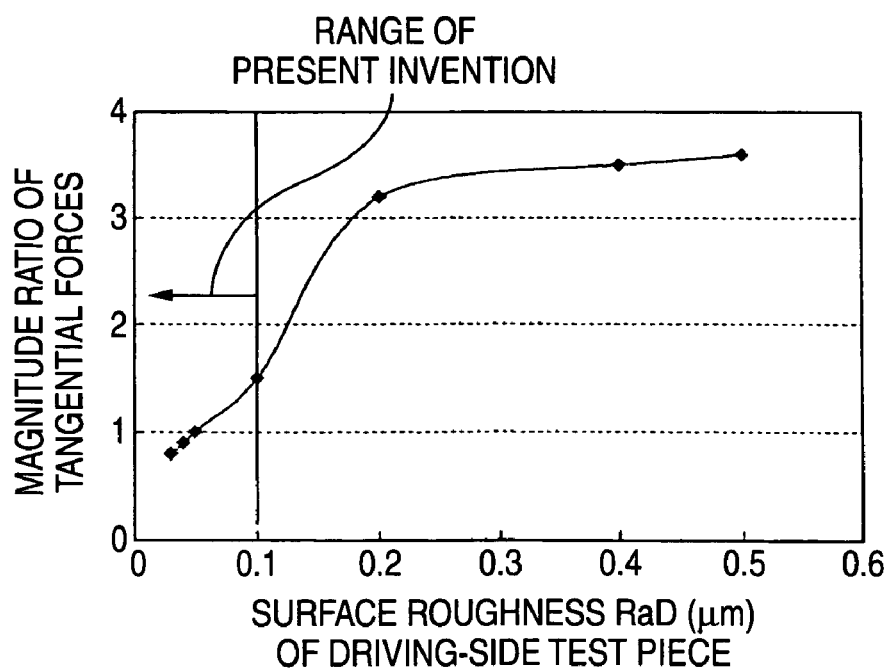
FIG. 15 is a graph showing a relationship between a surface roughness of the driving-side test piece and a ratio of a magnitude of a tangential force.

FIG. 15 shows investigated results of a difference in magnitudes of the tangential force acting on both test pieces in the case where the surface roughness of the driving-side test piece used to simulate the rolling element is changed while keeping the average roughness of the surface of the driven-side test piece used to simulate the inner ring constant at RaF=0.1 μm by the two-cylinder testing machine. In FIG. 15, the tangential force is given as a ratio of the magnitude when the tangential force obtained at the average roughness RaD=0.5 μm of the surface of the driving-side test piece is assumed as 1.

Figure 16:
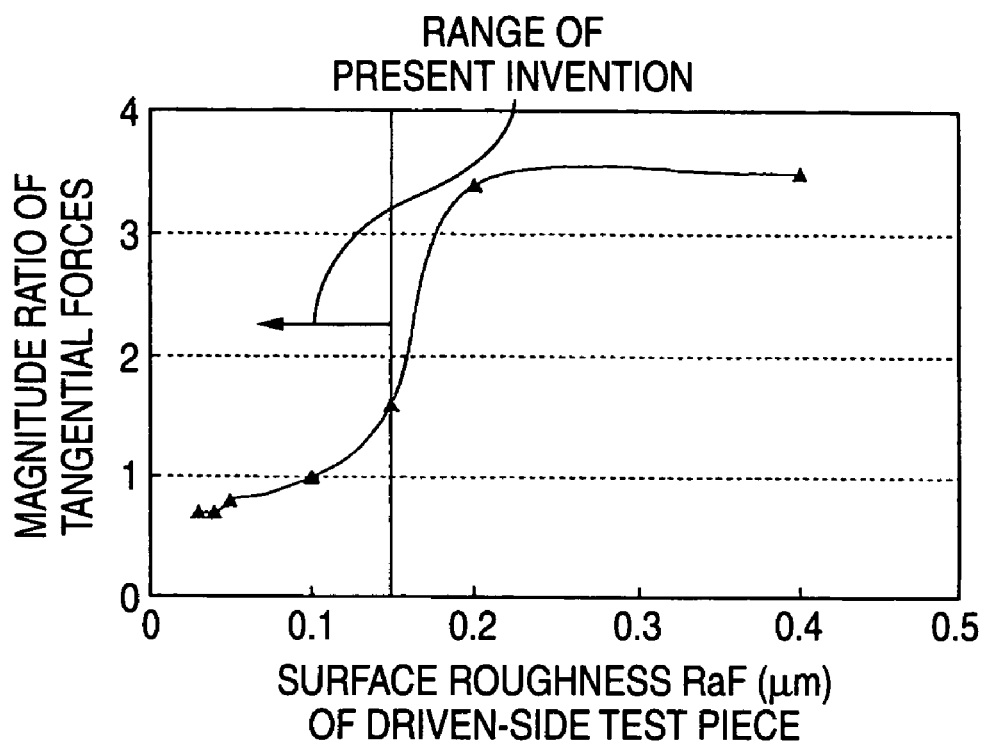
FIG. 16 is a graph showing a relationship between a surface roughness of the driven-side test piece and a ratio of a magnitude of a tangential force.

Also, FIG. 16 shows investigated results of a difference in magnitudes of the tangential force acting on both test pieces in the case where the surface roughness of the driven-side test piece used to simulate the inner ring is changed while keeping the average roughness of the surface of the driving-side test piece used to simulate the rolling element constant at RaD=0.05 μm by the two-cylinder testing machine. In FIG. 16, the tangential force is given as a ratio of the magnitude when the tangential force obtained at the average roughness RaF=0.1 μm of the surface of the driven-side test piece is assumed as 1.

In this case, the high carbon chromium bearing steel (SUJ2) was used as the material of respective test pieces on the driving side and the driven side. The quenching was applied to this steel at 830 to 850° C. and then the tempering was applied to this steel at 160 to 240° C. As a result, the tangential force was increased larger in both the test piece used to simulate the rolling element and the driven-side test piece used to simulate the inner ring as the surface roughness is increased larger, but the tangential force tended to rapidly increase when the average roughness of the surface of the driving-side test piece is increased larger than RaD≧0.1 μm and the average roughness of the surface of the driven-side test piece is increased larger than RaF≧0.15 μm.

Consequently, it is effective in suppressing the tangential force acting on the inner ring and the rolling element that the average roughness of the inner ring raceway surface should be set to Ra<0.15 μm and the average roughness of the rolling contact surface of the rolling element should be set to Ra<0.1 μm. In this event, judging from the result of the life test described later, preferably the average roughness of the inner ring raceway surface should be set to Ra<0.1 μm and the average roughness of the rolling contact surface of the rolling element should be set to Ra<0.05 μm. As the lower limit owing to a limit on production, the average roughness of the inner ring raceway surface is Ra>0.001 μm and the average roughness of the rolling contact surface of the rolling element is Ra>0.001 μm.

Next, the approach of suppressing the slip between the inner ring and the rolling element by reducing the rotation speed of the rolling element to bring the rolling element close to the pure rolling state in (C), as another measure of suppressing the tangential force acting on the inner ring and the rolling element, will be explained hereunder.

As the particular method of suppressing the rotation speed of the rolling element, the inventors of the present invention focus on the approach to make the surface roughness of the outer ring raceway surface coarse. An explanatory view of this approach is shown schematically in FIG. 17 and FIG. 18 respectively.

Figure 17:
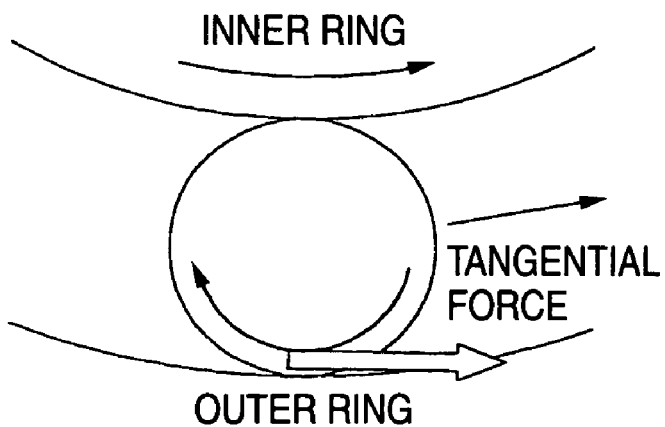
FIG. 17 is an explanatory view explaining a direction of the tangential force that the rolling element accepts from the outer ring in a load applying range.
Figure 18:
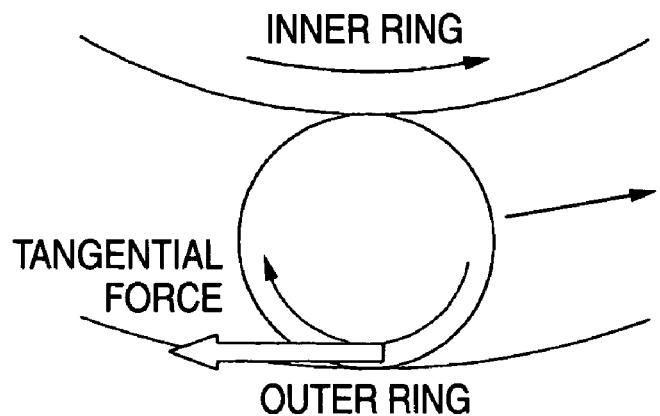
FIG. 18 is an explanatory view explaining a direction of the tangential force that the rolling element accepts from the outer ring in a load non-applying range.

FIG. 17 and FIG. 18 show the direction of the tangential force that the rolling element accepts from the outer ring in a load applying range and a load non-applying range respectively. Normally, the rotation speed of the rolling element becomes faster than the revolution speed of the rolling element in the load applying range. Accordingly, as shown in FIG. 17, the tangential force acting between the outer ring and the rolling element works in the direction to suppress the rotation speed of the rolling element.

In contrast, the rotation speed of the rolling element becomes slower than the revolution speed in the load non-applying range. Accordingly, as shown in FIG. 18, the tangential force acting between the outer ring and the rolling element works in the direction to enhance the rotation speed of the rolling element. In other words, when the surface roughness of the outer ring raceway surface is increased, the tangential force acting between the outer ring and the rolling element can be increased, as apparent from the results of two-cylinder test in FIG. 15 and FIG. 16, and thus the slip between inner ring and the rolling element can be suppressed by controlling the rotation of the rolling element.

In particular, in the load applying range in which the fracture makes progress, the rolling element receives the tangential force from the outer ring in the direction to suppress the rotation speed and also suppresses the tangential force caused by the speed difference (slip) between the inner ring and the rolling element. As a result, the lifetime can be prolonged against the fracture of the inner ring.

Judging from the result of two-cylinder test shown in FIG. 15 and FIG. 16, it is considered that, if the average roughness of the outer ring raceway surface is set to Ra≧0.1 μm as an extent of the average roughness of the outer ring raceway surface, which is effective for the lifetime enhancement, the tangential force acting between the outer ring and the rolling element can be increased and the rotation speed can be suppressed. If the average roughness of the outer ring raceway surface is increased, the fracture of the inner ring can be suppressed but the large tangential force acts of course on the outer ring. Therefore, if the average roughness of the outer ring raceway surface is set too large, this time the outer ring is broken down. As described later, if the average roughness of the outer ring raceway surface becomes Ra>0.5 μm, the lifetime is shortened due to the fracture of the outer ring on the contrary.

As a consequence, if the tangential force acting on the outer ring and the rolling element is increased by setting the average roughness of the outer ring raceway surface to 0.1 μm≦Ra≦0.5 μm to such an extent that the flaking of the outer ring is not caused, the rotation speed of the rolling element can be suppressed and also the tangential force acting on the inner ring and the rolling element can be suppressed, so that the lifetime enhancement of the self-aligning roller bearing can be achieved.

In order to check the effect of the present invention, the inventors the present invention performed following experiments. In the experiments, the self-aligning roller bearing model number 22211 was employed. The high carbon chromium bearing steel (SUJ2) was used as the inner and outer rings and the rolling element, and the above heat treatments were applied. The self-aligning roller bearing, which satisfies all the average roughness Ra<0.1 μm of the rolling contact surface of the rolling element, the average roughness Ra<0.15 μm of the inner ring raceway surface, and the average roughness 0.1 μm≦Ra≦0.5 μm of the outer ring raceway surface, was used as Embodiment of the present invention whereas the self-aligning roller bearing, which does not satisfy at least one of the above average roughnesses, was used as Comparative Example. Then, the lifetime comparing test was carried out.

The testing conditions are given as follows.

the number of revolution: 1500 min$^{-1}$ the test load: 45217 N the lubrication condition: RO68

Figure 19:
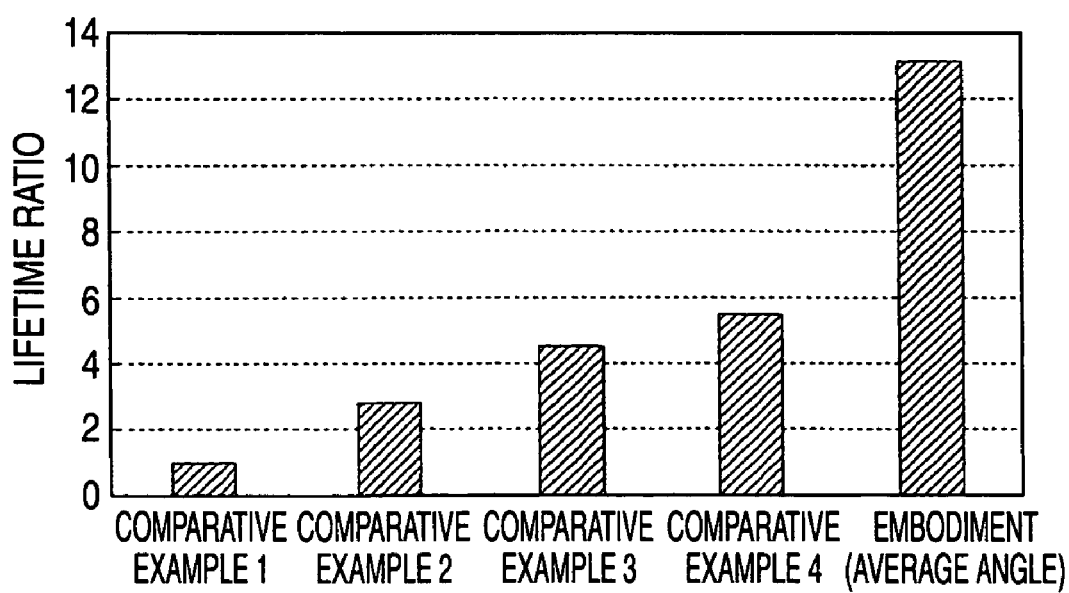
FIG. 19 is a graph showing the lifetime ratio in Table 3 in a summarized manner.

The test results are given in Table 3. The lifetime is indicated by a ratio obtained when the value in Comparative Example 1 in which the lifetime is shortest is assumed as 1. FIG. 19 is a graph showing the lifetimes of Embodiment of the present invention and Comparative Example in a summarized manner, based on the results in Table 3.

TABLE 3

| | (A) (μm) | (B) (μm) | (C) (μm) | Lifetime ratio | Remarks |
|---|---|---|---|---|---|
| EMB 1 | 0.164 | 0.8 | 0.012 | 15.4 | |
| EMB 2 | 0.153 | 0.083 | 0.026 | 13.3 | |
| EMB 3 | 0.144 | 0.115 | 0.039 | 11 | |
| EMB 4 | 0.147 | 0.116 | 0.04 | 12.7 | |
| EMB 5 | 0.163 | 0.094 | 0.033 | 14.2 | |
| EMB 6 | 0.152 | 0.143 | 0.095 | 9.6 | I.R, R.E→Upper limit of roughness |
| EMB 7 | 0.488 | 0.097 | 0.03 | 18 | O.R→Upper limit of roughness |
| EMB 8 | 0.102 | 0.092 | 0.047 | 10.9 | O.R→Lower limit of roughness |
| C.E 1 | 0.089 | 0.166 | 0.108 | 1 | O.R, I.R, R.E→Out of roughness range |
| C.E 2 | 0.082 | 0.161 | 0.035 | 2.8 | O.R, I.R→Out of roughness range |
| C.E 3 | 0.093 | 0.117 | 0.035 | 4.5 | O.R→Below the lower limit of roughness |
| C.E 4 | 0.556 | 0.109 | 0.03 | 5.5 | O.R→Over the upper limit of roughness |

*)(A): Average roughness of the outer ring (O.R)
(B): Average roughness of the inner ring (I.R)
(C): Average roughness of the rolling element (R.E)
C.E: Comparative Example As apparent from Table 3, like Comparative Example 2, if the average roughness of the rolling contact surface of the rolling element is merely suppressed within Ra<0.1 μm, the lifetime extending effect that is about three times larger than Comparative Example 1, in which the roughnesses of the outer ring, the inner ring, and the rolling element are out of a range of the present invention, can be attained. In addition, like Comparative Examples 3 and 4, if the average roughness of the inner ring raceway surface is suppressed within Ra<0.15 μm, the lifetime that is about five times longer than Comparative Example 1 can be attained. In contrast, like Embodiments 1 to 8 of the present invention, it is appreciated that, if not only are the average roughness of the rolling contact surface of the rolling element and the average roughness of the inner ring raceway surface suppressed within Ra<0.1 μm and Ra<0.15 μm respectively but also the average roughness of the outer ring raceway surface is set within 0.1 μm≦Ra≦0.5 μm, the extension of the lifetime that is ten times or more longer than Comparative Example 1 can be attained.

In other words, these results suggest the fact that the lifetime can be extended by reducing the surface roughness of the rolling contact surface of the rolling element and the inner ring raceway surface to suppress the tangential force acting between the inner ring and the rolling element, and that the lifetime can be extended ten times or more rather than the bearing, which is out of a range of the present invention, by increasing the surface roughness of the outer ring raceway surface to suppress the rotation motion of the rolling element in the load applying range and to reduce further the tangential force acting on the inner ring.

However, like Comparative Example 4 in Table 3, if the average roughness of the outer ring raceway surface is set excessively large like Ra>0.5 μm, the bearing lifetime extending effect cannot be achieved because the flaking of the inner ring is suppressed but conversely the flaking of the outer ring is caused. Therefore, the average roughness of the outer ring raceway surface must be suppressed within Ra≦0.5 μm.

Next, a third embodiment of the present invention will be explained with reference to FIGS. 20 to 22 hereinafter.

Figure 20:
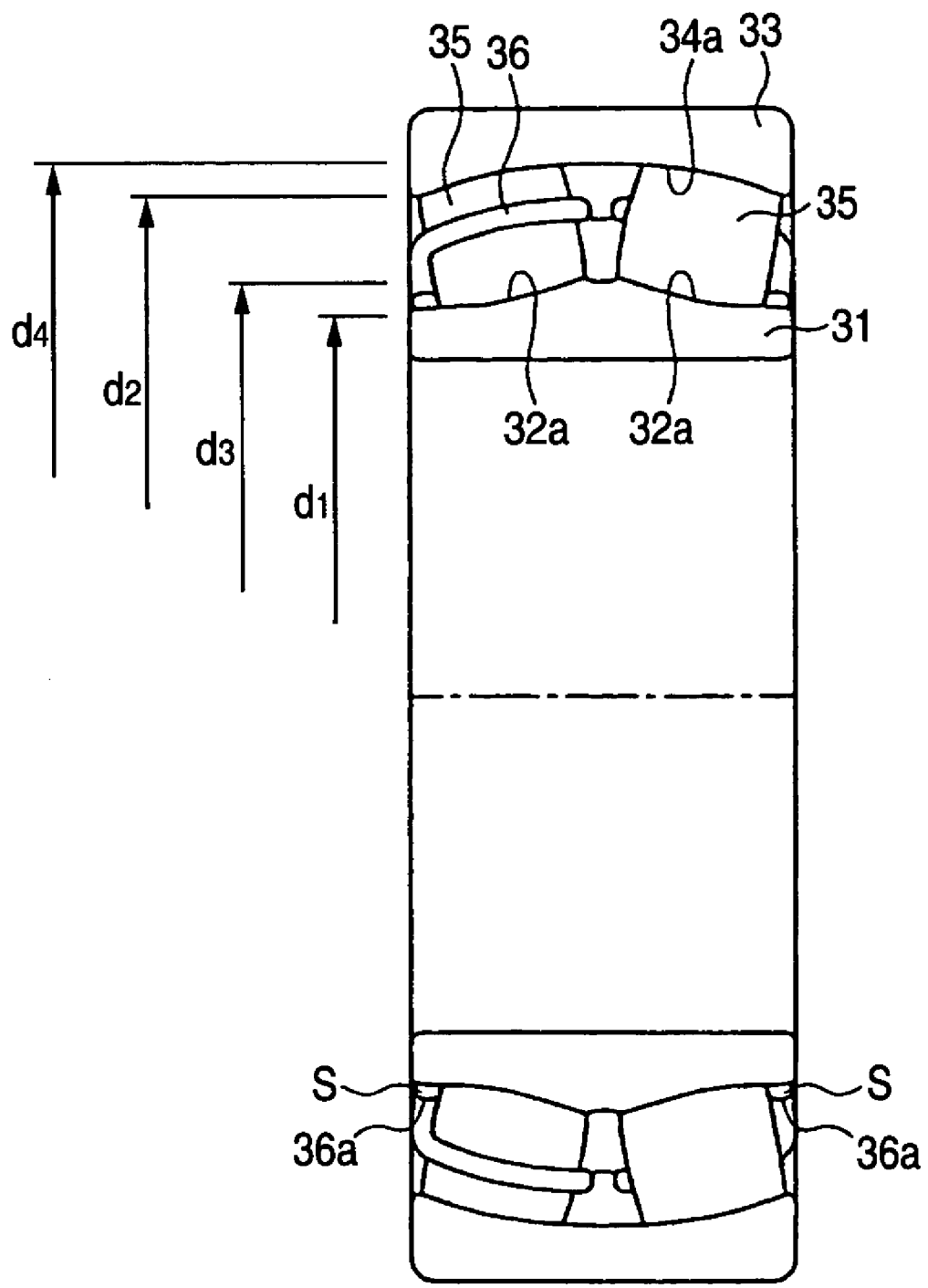
FIG. 20 is a schematic general view showing an axial sectional shape of a self-aligning roller bearing according to a third embodiment of the present invention.
Figure 21:
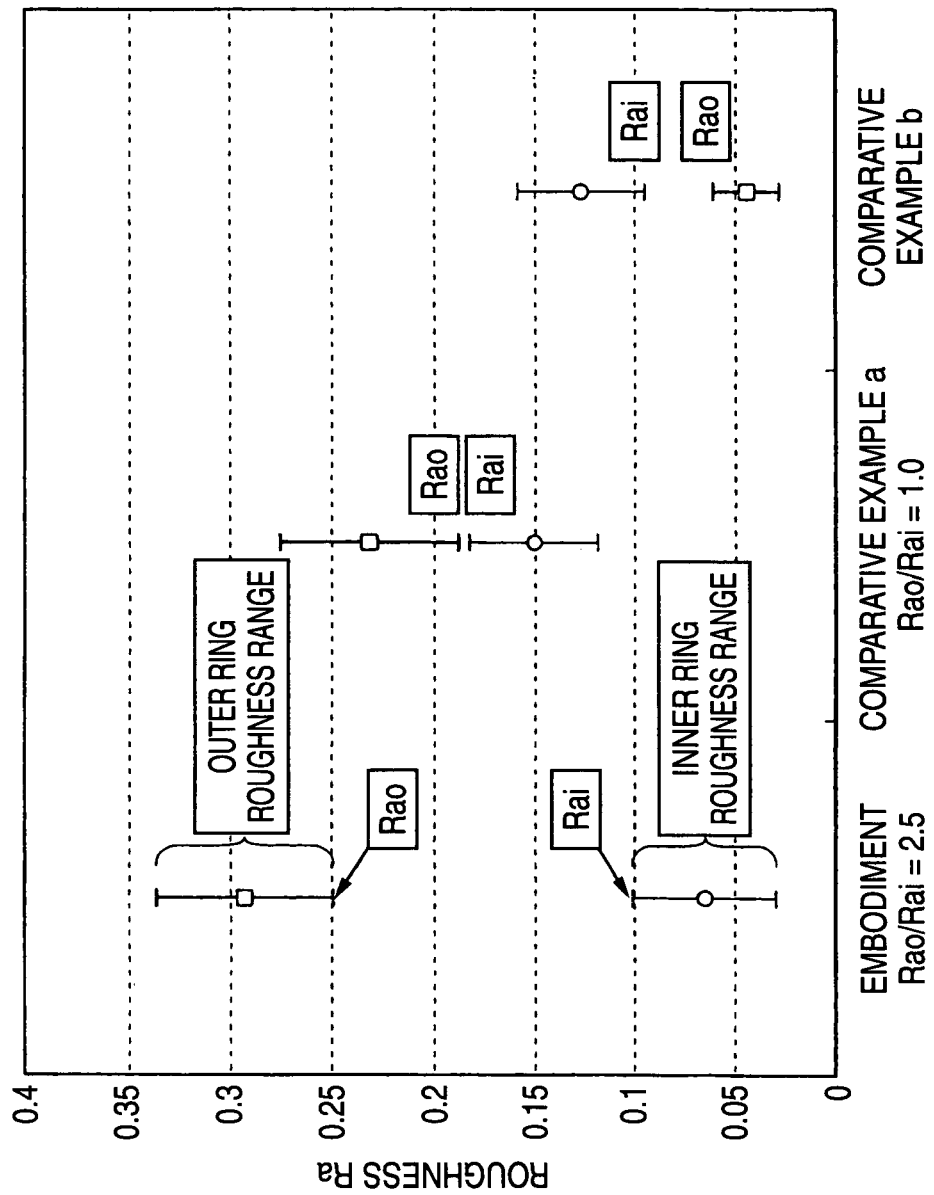
FIG. 21 is a view showing ranges of a surface roughness of an outer ring raceway surface and an inner ring raceway surface and a ratio between a lower limit value Rao in the roughness range of the outer ring and an upper limit value Rai in the roughness range of the inner ring.

FIG. 20 is a longitudinal sectional view showing a self-aligning roller bearing according to a third embodiment of the present invention. In FIG. 20, the self-aligning roller bearing according to a third embodiment of the present invention is constructed by an inner ring 31 having double row raceways (also referred to as "inner ring raceway surfaces" hereinafter) 32a, an outer ring 33 having a double row integral spherical raceway (also referred to as an "outer ring raceway surface" hereinafter) 34a, a plurality of rollers 35 incorporated between the inner ring raceway surfaces 32a and the outer ring raceway surface 34a in double rows, and a retainer 36 for holding the rollers 35 rollably.

In the inner ring raceway surfaces 32a and the outer ring raceway surface 34a, diameters d3, d4 of a center portion are set larger than diameters d1, d2 of both end portions. A shape of the retainer 36 is not limited to the illustrated example and other modes can be applied. But both end surfaces 36a in the width direction are opposed to each other via both end portions of the inner ring raceway surfaces 32a and clearances S.

The inventors of the present invention made clear the facts that, in the case where the surface roughness of the outer ring raceway surface is formed larger than the surface roughness of the inner ring raceway surface for the purpose of stabilizing the rolling motion of the roller, it is effective in suppressing a minute slip on the contact surface generated due to variation in the frictional force by reducing the variation in the frictional forces generated at contact portions between the roller and the inner ring and between the roller and the outer ring during the running of the bearing that not only the outer ring raceway surface should be made coarser than the inner ring raceway surface in terms of the mere average roughness but also a variation in the surface roughness of the inner ring raceway surface and the outer ring raceway surface should be considered. Also, the inventors of the present invention made clear the fact that, since the portion that is subjected to the maximum surface fatigue can be shifted from the inner and outer rings to the rolling element by optimizing the relationship between the surface roughnesses of the inner and outer ring raceway surfaces with regard to the variation, the lifetime enhancement can be achieved by selecting the roller material and the heat treatment specification that are resistant to the peeling.

More particularly, the present invention has a characteristic configuration in respects that the surface roughnesses of the inner ring raceway surface 32a and the outer ring raceway surface 34a should be adjusted (lower limit value Rao of a roughness range on the outer ring raceway surface on a center line/upper limit value Rai of a roughness range on the inner ring raceway surface on a center line≧1.5) and that a difference in the retained austenite content between the rolling element 35 and the raceway rings 31, 33 should be adjusted (γR(rolling element)−γR(raceway ring)≧3%).

An explanation will be made only of the characteristic configurative portion, and explanations of other configurative portions, e.g., the inner ring 31, the outer ring 33, the roller 35, the retainer 36, etc. will be omitted herein. But these configurative portions can be varied in design appropriately within a scope of the present invention.

Here, in the present invention, the average roughnesses of the inner ring raceway surface 32a and the outer ring raceway surface 34a on the center line were measured at two different locations or more on the circumferences of the inner ring 31 and the outer ring 33 respectively, then standard deviations a were calculated based on the average value, and then the roughness derived when ±3 σ is calculated with respect to the average value was employed as the "roughness range" of the present invention.

In the roughness range of the inner ring raceway surface 32a and the outer ring raceway surface 34a, an upper limit value of the roughness range of the inner ring raceway surface 32a is set to Rai and a lower limit value of the roughness range of the outer ring raceway surface 34a is set to Rao. The relationships between the roughness ranges and Rao and Rai are schematically shown FIG. 21.

In the present invention, if the lower limit value Rao in the roughness range of the outer ring raceway surface 34a and the upper limit value Rai in the roughness range of the inner ring raceway surface 32a are viewed in the light of the roughness range, a difference in the roughness between the outer ring raceway surface 34a and the inner ring raceway surface 32a is mostly reduced, i.e., a difference in the frictional force between the outer ring 33 and the roller 35 and between the inner ring 31 and the roller 35, and thus the effect produced by making the outer ring raceway surface 34a coarse is brought into its smallest state.

Also, in the case where a variation of the roughness is very large, even though the average value of roughness of the outer ring raceway surface 34a is larger than that of the inner ring raceway surface 32a, both values are almost equal to each other (Comparative Example a in FIG. 20) when Rao and Rai are compared with each other, or it may be supposed that Rai becomes rough rather than Rao (Comparative Example b in FIG. 20) as the case may be. In such case, primarily the frictional force between the outer ring 33 and the roller 35 must be larger than that between the inner ring 31 and the roller 35, nevertheless the inversion phenomenon such that the frictional force between the inner ring 31 and the roller 35 becomes larger occurs according to the particular portion. Thus, the frictional force is largely varied during the revolution of the roller 35. As a result, the rotation/revolution of the roller 35 become unstable, then the minute slip is induced at the contact portion between the inner ring 31 and the roller 35, and then the surface fatigue such as the peeling is ready to be caused.

In contrast, in the present embodiment, under the condition that a ratio of the upper limit value Rai of the roughness range of the inner ring raceway surface 32a to the lower limit value Rao of the roughness range of the outer ring raceway surface 34a is set to 1.5 or more, the state that the roughness of the outer ring raceway surface 34a is larger than that of the inner ring raceway surface 32a can be always kept by taking account of not only the average roughness but also the variation of roughness in the inside of the bearing. As shown in FIG. 21, a ratio Rao/Rai=2.5 is employed in the present embodiment.

Accordingly, the frictional forces between the roller 35 and the raceway rings 31, 33 are not largely varied during the running of the bearing. Therefore, the slip in the minute area is hard to occur and thus the surface damage such as the peeling, or the like on the inner ring 31 can be suppressed.

In the case where the steel SUJ2 that is used normally is used as the material of the roller 35, if the tempering executed after the quenching is applied in the low temperature range of 160 to 220° C. instead of the high temperature tempering, unlike the heat treatment of the raceway rings 31, 33, the hardness can be set to Hv 700 or more and the retained austenite content γR can be caused to remain in a range of 3 to 12% in volume ratio. With this configuration, the roller is very resistant to the peeling.

Also, in the case where the rollers made of SUJ2 are used, if the carbonitriding process that is exemplified by the marstressing is applied, the retained austenite content γR is increased because the nitrogen is solid-dissolved in the base material, and also generation of the peeling can be suppressed much more by the effect of the solid-dissolved nitrogen. Also, if the retained austenite content γR is kept at 3% or more, inevitably the hardness of the rolling element 35 becomes harder than that of the inner and outer rings 31, 33 and thus such treatment is more effective for the peeling damage. It is desired that a difference in the hardness should be set to Hv 30 or more by the micro Vickers hardness.

In order to check the effect of the present invention, the life test was applied to respective bearings in Embodiments 1 to 12 and Comparative Examples 1 to 7, and Embodiments in which the lifetime was evaluated based on L10 life will be explained. The test results are given in Table 4.

Here, the testing conditions are given as follows.

"Testing Conditions"

the number of revolution: 25 s$^{-1}$ (1500 rpm)

the test load: 45217 N the lubrication condition: forced circulation oil (VG68)

the bearing specification: self-aligning roller bearing (model number 22211)

As the material of the inner and outer rings and the roller, SUJ2 (high carbon chromium bearing steel) was used respectively. Also, the heat treatment applied to the inner and outer rings and the roller respectively were given as follows.

<Inner and outer rings>

830 to 850° C. quenching 220 to 240° C.×2 hour tempering

<Roller>

① 830 to 850° C. quenching 160 to 260° C.×2 hour tempering

② 820 to 840° C. carbonitriding and then quenching 160 to 200° C.×2 hour tempering The roughnesses of the inner ring raceway surface and the outer ring raceway surface, the hardness of the rolling element, and the retained austenite content are given in Table 4.

As for the roughnesses of the inner and outer ring raceway surfaces, the roughness on the center line was measured at three locations, then the roughness range was calculated based on the standard deviation σ, and then Rao and Rai were calculated.

TABLE 4

|  | (A) | (B) | (C) | (D) | (E) | (F) | (G) |
|---|---|---|---|---|---|---|---|
| EMB 1 | 180 | 0.293 | 0.044 | 0.065 | 0.036 | 0.249 | 0.101 |
| EMB 2 | 180 | 0.300 | 0.053 | 0.055 | 0.021 | 0.247 | 0.076 |
| EMB 3 | 180 | 0.352 | 0.053 | 0.078 | 0.042 | 0.299 | 0.12 |
| EMB 4 | 180 | 0.239 | 0.048 | 0.052 | 0.023 | 0.191 | 0.075 |
| EMB 5 | 180 | 0.239 | 0.044 | 0.063 | 0.023 | 0.195 | 0.086 |
| EMB 6 | 180 | 0.273 | 0.123 | 0.065 | 0.024 | 0.15 | 0.089 |
| EMB 7 | 180 | 0.193 | 0.039 | 0.081 | 0.021 | 0.154 | 0.102 |
| EMB 8 | 180 | 0.367 | 0.048 | 0.071 | 0.025 | 0.319 | 0.096 |
| EMB 9 | 180 | 0.385 | 0.055 | 0.074 | 0.033 | 0.33 | 0.107 |
| EMB 10 | 200 | 0.296 | 0.044 | 0.081 | 0.036 | 0.252 | 0.117 |
| EMB 11 | 220 | 0.293 | 0.052 | 0.092 | 0.039 | 0.241 | 0.131 |
| EMB 12 | 180 | 0.392 | 0.033 | 0.065 | 0.017 | 0.359 | 0.082 |
| C.E 1 | 260 | 0.239 | 0.048 | 0.052 | 0.023 | 0.191 | 0.075 |
| C.E 2 | 240 | 0.239 | 0.044 | 0.063 | 0.023 | 0.195 | 0.086 |
| C.E 3 | 180 | 0.044 | 0.016 | 0.126 | 0.032 | 0.028 | 0.158 |
| C.E 4 | 180 | 0.312 | 0.046 | 0.149 | 0.032 | 0.266 | 0.181 |
| C.E 5 | 180 | 0.231 | 0.042 | 0.15 | 0.032 | 0.189 | 0.182 |
| C.E 6 | 180 | 0.092 | 0.016 | 0.048 | 0.021 | 0.076 | 0.069 |
| C.E 7 | 180 | 0.123 | 0.024 | 0.115 | 0.023 | 0.099 | 0.138 |

|  | Rao/Rai | (H) | (I) | ΔHv | (J) | (K) | ΔγR | (L) |
|---|---|---|---|---|---|---|---|---|
| EMB 1 | 2.47 | 793 | 676 | 117 | 9 | 0 | 9.1 | 2.2 |
| EMB 2 | 3.25 | 785 | 673 | 112 | 9 | 1 | 7.6 | 2.1 |
| EMB 3 | 2.49 | 785 | 670 | 115 | 8 | 0 | 8.1 | 2.1 |
| EMB 4 | 2.55 | 790 | 667 | 123 | 8 | 1 | 6.6 | 2 |
| EMB 5 | 2.27 | 763 | 670 | 93 | 8 | 1 | 6.8 | 1.9 |
| EMB 6 | 1.69 | 777 | 661 | 116 | 8 | 1 | 7.3 | 1.8 |
| EMB 7 | 1.51 | 795 | 666 | 129 | 9 | 0 | 8.8 | 1.7 |
| EMB 8 | 3.32 | 793 | 688 | 105 | 9 | 0 | 8.9 | 2.1 |
| EMB 9 | 3.08 | 788 | 690 | 98 | 9 | 1 | 7.5 | 2 |
| EMB 10 | 2.15 | 710 | 678 | 32 | 5 | 0 | 5.3 | 1.6 |
| EMB 11 | 1.84 | 708 | 678 | 30 | 3 | 0 | 3 | 1.5 |
| EMB 12 | 4.38 | 793 | 679 | 114 | 7 | 0 | 7 | 1.7 |
| C.E 1 | 2.55 | 687 | 683 | 4 | 0 | 0 | 0 | 1.2 |
| C.E 2 | 2.27 | 695 | 676 | 19 | 2 | 0 | 2 | 1.2 |
| C.E 3 | 0.18 | 785 | 688 | 97 | 9 | 1 | 7.6 | 1 |
| C.E 4 | 1.47 | 792 | 680 | 112 | 9 | 0 | 9.3 | 1.3 |
| C.E 5 | 1.04 | 793 | 682 | 111 | 8 | 0 | 7.5 | 1.2 |
| C.E 6 | 1.10 | 768 | 675 | 93 | 8 | 0 | 7.5 | 1.1 |
| C.E 7 | 0.72 | 783 | 688 | 95 | 6 | 0 | 6.4 | 1.1 |

*)(A): Roller Annealing (Tempering) (° C.)
(B): Average roughness value on an outer ring center line
(C): Outer ring 3σ
(D): Average roughness value on an inner ring center line
(E): Inner ring 3σ
(F): Lower limit Rai of an outer ring roughness range
(G): Upper limit Rao of an inner ring roughness range
(H): Rolling element hardness
(I): Inner ring hardness
(J): Retained austenite content of the rolling element (vol %)
(K): Retained austenite content of the inner ring (vol %)
(L): L10 lifetime ratio
EMB: Embodiment
C.E: comparative Example Also, FIG. 22 is a view showing a relationship between a ratio Rao/Rai and a lifetime ratio while the heat treatment conditions of the inner and outer rings and the roller are kept constant. The "lifetime ratio" denotes a ratio derived when the calculated lifetime under the above testing conditions is assumed as 1.

According to Table 4, the Rao/Rai value is in a range of 0.18 to 2.55 in Comparative Examples 1 to 7, while the Rao/Rai value is in a range of 1.51 to 4.38 in Embodiments 1 to 12. Also, γR(rolling element)–γR(raceway ring) is in a range of 0 to 9.3 vol % in Comparative Examples 1 to 7, while γR(rolling element)–γR(raceway ring) is in a range of 3 to 9.1 vol % in Embodiments 1 to 12.

Then, the L10 lifetime ratio is in a range of 1 to 1.3 in Comparative Examples 1 to 7, while the L10 lifetime ratio is in a range of 1.5 to 2.2 in Embodiments 1 to 12 and it is found that the lifetime is small.

Figure 22:
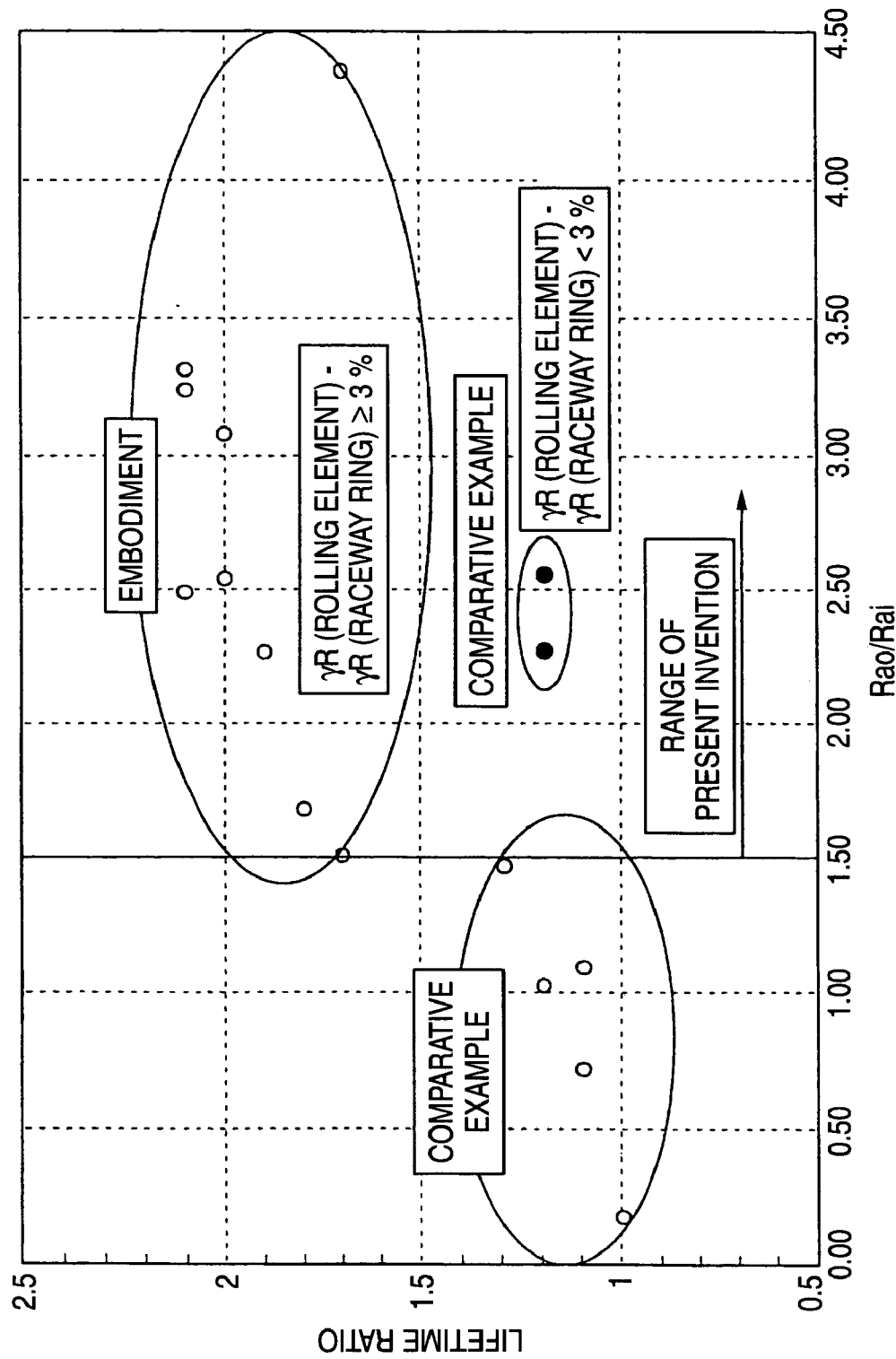
FIG. 22 is a view showing a relationship between a ratio between the lower limit value Rao in the roughness range of the outer ring and the upper limit value Rai in the roughness range of the inner ring and the lifetime ratio.

In case the relationship between the roughnesses of the inner and outer rings is examined, it is appreciated that, as shown in FIG. 22, the lifetime extending effect becomes remarkable when the above Rao/Rai value is 1.5 or more, as in Embodiments 1 to 12.

In case the Rao/Rai value is smaller than 1.5 like Comparative Examples 3 to 7, the magnitude of the frictional force between the outer ring and the roller becomes insufficient, and thus the rolling motion of the roller is rendered unstable. As a result, the slip is generated at the contact portion between the inner ring and the raceway ring to cause the peeling and thus the lifetime is shortened. In contrast, in case the Rao/Rai value is larger than 1.5 like Embodiments 1 to 12, it is understood that the surface damage such as the peeling, or the like is never caused on the inner ring and thus the lifetime is prolonged.

Therefore, in the present invention, the Rao/Rai value is set to 1.5 or more. Also, if the Rao/Rai value is set too large like Embodiment 12, the effect is saturated. Therefore, it is desired that the Rao/Rai value should be set to 2.0 or more but 3.5 or less.

In particular, if the surface roughness of the outer ring raceway surface is set markedly coarse and the insufficient oil film is formed, the surface damage such as the peeling, or the like is apt to be generated. Therefore, it is desired that an upper limit of an absolute value of the average roughness of the outer ring raceway surface should be set to 0.4 μmRa.

Also, in Table 4, in Embodiments of the present invention, the hardness of the rolling element is set larger than that of the inner and outer rings, a difference in the retained austenite content of the rolling element is set to 3% or more, and the Rao/Rai value is set to 1.5 or more. Therefore, since the roller can fulfill the material specification that is resistant to the surface damage even when the fatigue shifts to such roller, the longer lifetime of the bearing can be achieved.

Also, like Embodiment 12, in case the carbonitriding process is applied to the roller, the retained austenite content can be enhanced because of the solid solution of nitrogen and also the hardness can also be held highly. Therefore, the lifetime extending effect can be enhanced particularly.

In Comparative Examples 1 and 2, the Rao/Rai value is set to 1.5 or more, but the hardnesses of the raceway rings and the rolling element are set substantially equal to each other by applying the high temperature tempering process to the roller as in the raceway rings and also there is no difference in the retained austenite content between the raceway rings and the rolling element because the retained austenite content is almost 0%. In this case, as described above, because the surface roughness of the outer ring raceway surface is rendered coarse, the location in which the surface fatigue is generated shifts from the inner ring to the roller, but the surface damage is generated on the roller to cause the peeling. Therefore, the lifetime of the bearing is shortened.

The present invention is explained in detail with reference to the particular embodiments. But it is apparent to those skilled in the art that various variation and modifications may be applied without departing from a spirit and a scope of the present invention.

Also, the present invention may be applied while using respective embodiments in combination. For example, the self-aligning roller bearing of the present invention may be constructed by combining a part of the first embodiment with a part of the second embodiment and/or the third embodiment, or may be constructed by combining a part of the second embodiment with a part of the third embodiment.

As the particular example, in the self-aligning roller bearing of the first embodiment, the average roughness of the rolling contact surface of the rolling element may be set to Ra<0.1 μm and the average roughness of the inner ring raceway surface may be set to Ra<0.15 μm, and also the upper limit value Rai of the roughness range of the inner ring raceway surface on a center line and the lower limit value Rao of the roughness range of the outer ring raceway surface on a center line may be set to satisfy an inequality Rao/Rai≧1.5, and a difference of the retained austenite content γR between the rolling elements and the raceway rings may be set to 3% or more in volume ratio. In addition, in the self-aligning roller bearing of the first embodiment or the second embodiment, the upper limit value Rai of the roughness range of the inner ring raceway surface on a center line and the lower limit value Rao of the roughness range of the outer ring raceway surface on a center line may be set to satisfy an inequality Rao/Rai≧1.5, and a difference of the retained austenite content γR between the rolling elements and the raceway rings may be set to 3% or more in volume ratio. Further, in the self-aligning roller bearing of the second embodiment or the third embodiment, the outer ring raceway surface may be subjected to the grinding while setting the rotation axis of the grindstone in parallel with the central axis of the outer ring, and then may be subjected to the super finishing while swinging the grindstone along the axial direction of the outer ring.

The invention claimed is:

1. A self-aligning roller bearing in which double row rollers as rolling elements are arranged rollably between an inner ring and an outer ring in a circumferential direction,
   wherein a roughness of an outer ring raceway surface formed on an inner peripheral surface of the outer ring is made larger than a roughness of an inner ring raceway surface formed on an outer peripheral surface of the inner ring, and
   an average roughness Ra of the outer ring raceway surface is set within 0.1 μm≦Ra≦0.5 μm in an axial direction and a circumferential direction, and a roughness parameter S that is defined by $$S = \frac{1}{n}\sum_{i=1}^{n} S_i$$

where n is a number of peaks of the roughness of a roughness curve indicating the roughness of the outer ring raceway surface, and
   Si is an interval between neighboring peaks of the roughness curve is set within 0<S≦20 μm.

2. A self-aligning roller bearing according to claim 1, wherein an average roughness of a rolling contact surface of the rolling element is set to Ra<0.1 μm, and an average roughness of the inner ring raceway surface is set to Ra<0.15 μm.

3. A self-aligning roller bearing according to claim 2, wherein an inequality Rao/Rai≧1.5 is satisfied where Rai is an upper limit value of a roughness range on the inner ring raceway surface on a center line and Rao is a lower limit value of a roughness range on the inner ring raceway surface on a center line, and a difference of a retained austenite content γR between the rolling elements and at least any one of the inner ring and the outer ring is set to 3% or more in volume ratio.

4. A self-aligning roller bearing according to claim 1, wherein an inequality Rao/Rai≧1.5 is satisfied where Rai is an upper limit value of a roughness range on the inner ring raceway surface on a center line and Rao is a lower limit value of a roughness range on the inner ring raceway surface on a center line, and a difference of a retained austenite content γR between the rolling elements and at least any one of the inner ring and the outer ring is set to 3% or more in volume ratio.

5. A self-aligning roller bearing according to claim 1, wherein the average roughness Ra of the outer ring raceway surface is set within 0.1 μm≦Ra≦0.5 μm in the axial direction and the circumferential direction in ranges of $b_1/(B/2)$ ≦0.9, $b_2/(B/2)$≦0.9 and in a measured length of 0.1 mm to 1.0 mm where B is a width of the outer ring and $b_1$, $b_2$ are a distance from both end surfaces of the outer ring respectively, and the roughness parameter S is set within 0<S≦20 μm.

6. A self-aligning roller bearing according to claim 1, wherein the outer ring raceway surface has machining traces that intersect with each other and the machining traces are formed by a super finishing.

7. A self-aligning roller bearing in which double row rollers as rolling elements are arranged rollably between an inner ring and an outer ring in a circumferential direction,
   wherein a roughness of an outer ring raceway surface formed on an inner peripheral surface of the outer ring is made larger than a roughness of an inner ring raceway surface formed on an outer peripheral surface of the inner ring, and
   an average roughness Ra of the outer ring raceway surface is set within $0.1 \, \mu m \leqq Ra \leqq 0.5 \, \mu m$ in an axial direction and a circumferential direction, an average roughness of a rolling contact surface of the rolling element is set to $Ra<0.1 \, \mu m$, and an average roughness of the inner ring raceway surface is set to $Ra<0.15 \, \mu m$.

8. A self-aligning roller bearing according to claim 7, wherein an inequality $Rao/Rai \geqq 1.5$ is satisfied where Rai is an upper limit value of a roughness range on the inner ring raceway surface on a center line and Rao is a lower limit value of a roughness range on the inner ring raceway surface on a center line, and a difference of a retained austenite content γR between the rolling elements and at least any one of the inner ring and the outer ring is set to 3% or more in volume ratio.

9. A self-aligning roller bearing according to claim 7, wherein the outer ring raceway surface has machining traces that intersect with each other and the machining traces are formed by a super finishing.

10. A self-aligning roller bearing in which double row rollers as rolling elements are arranged rollably between an inner ring and an outer ring in a circumferential direction,
    wherein a roughness of an outer ring raceway surface formed on an inner peripheral surface of the outer ring is made larger than a roughness of an inner ring raceway surface formed on an outer peripheral surface of the inner ring, and
    an inequality $Rao/Rai \geqq 1.5$ is satisfied where Rai is an upper limit value of a roughness range on the inner ring raceway surface on a center line and Rao is a lower limit value of a roughness range on the inner ring raceway surface on a center line, and a difference of a retained austenite content γR between the rolling elements and at least any one of the inner ring and the outer ring is set to 3% or more in volume ratio.

11. A self-aligning roller bearing according to claim 10, wherein the outer ring raceway surface has machining traces that intersect with each other and the machining traces are formed by a super finishing.

\* \* \* \* \*